(12) United States Patent
Honda et al.

(10) Patent No.: US 9,906,716 B2
(45) Date of Patent: Feb. 27, 2018

(54) IMAGE PICKUP APPARATUS, IMAGE PICKUP METHOD, AND RECORDING MEDIUM FOR CONTROLLING PIXEL SHIFTS

(71) Applicant: Olympus Corporation, Hachioji-shi, Tokyo (JP)

(72) Inventors: Tsutomu Honda, Hachioji (JP); Keiji Kunishige, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/156,824

(22) Filed: May 17, 2016

(65) Prior Publication Data

US 2016/0373649 A1    Dec. 22, 2016

(30) Foreign Application Priority Data

Jun. 16, 2015    (JP) .................................. 2015-121393

(51) Int. Cl.
*H04N 5/232*    (2006.01)
*H04N 5/335*    (2011.01)

(52) U.S. Cl.
CPC ......... *H04N 5/23232* (2013.01); *H04N 5/335* (2013.01)

(58) Field of Classification Search
CPC ........................... H04N 5/23232; H04N 5/335
See application file for complete search history.

(56) References Cited

U.S. PATENT DOCUMENTS

| | | | |
|---|---|---|---|
| 6,195,125 B1* | 2/2001 | Udagawa | H04N 3/1587 348/218.1 |
| 2002/0126210 A1* | 9/2002 | Shinohara | H04N 3/1587 348/219.1 |
| 2009/0021594 A1* | 1/2009 | Tsuda | H04N 5/235 348/222.1 |
| 2012/0013737 A1* | 1/2012 | Umeyama | H04N 5/235 348/135 |
| 2014/0125828 A1* | 5/2014 | Takeuchi | H04N 5/2254 348/208.99 |

FOREIGN PATENT DOCUMENTS

JP        07-177424        7/1995

* cited by examiner

*Primary Examiner* — Gevell Selby
(74) *Attorney, Agent, or Firm* — John C. Pokotylo; Pokotylo Patent Services

(57) ABSTRACT

An image pickup apparatus includes an image pickup device, a VCM that performs a pixel shift, and a microcomputer that causes the VCM to perform pixel shifts to a plurality of different positions and causes the image pickup device to pick up an image and acquire a plurality of images. The microcomputer causes the VCM to perform the pixel shift in pixel shift order in which an image higher in image quality than one image acquired from the image pickup device can be composed even when image processing is performed on the basis of two or more images less than a predetermined number necessary for composition of a high-quality image.

13 Claims, 23 Drawing Sheets

FIG. 7

| NUMBER OF IMAGES TO BE COMBINED | LONGITUDINAL × LATERAL RESOLUTION MAGNIFICATION | NO COMPLEMENTATION | OBLIQUE PIXEL SHIFT COMPLEMENTATION | PIXEL COMPLEMENTATION | DIVISION COMPLEMENTATION |
|---|---|---|---|---|---|
| ONE | 1×1 | | | R, G, B | |
| TWO | 1×1 | G | | R, B | |
| FOUR | 1×1 | R, G, B | | | |
| SIX | 2×2 | R, G, B | G | | R, B |
| EIGHT | 2×2 | R, G, B | R, G, B | | |

FIG. 27

| NUMBER OF IMAGES TO BE COMBINED | LONGITUDINAL × LATERAL RESOLUTION MAGNIFICATION | NO COMPLEMENTATION | OBLIQUE PIXEL SHIFT COMPLEMENTATION | PIXEL COMPLEMENTATION | DIVISION COMPLEMENTATION |
|---|---|---|---|---|---|
| ONE | 1×1 | | | R, G, B | |
| TWO | 1×1 | G | | R, B | |
| FOUR | 2×2 | G | G | R, B | R, B |
| SIX | 2×2 | R, G, B | G | | R, B |
| EIGHT | 2×2 | R, G, B | R, G, B | | |

IMAGE PICKUP APPARATUS, IMAGE PICKUP METHOD, AND RECORDING MEDIUM FOR CONTROLLING PIXEL SHIFTS

CROSS REFERENCE TO RELATED APPLICATION

This application claims benefit of Japanese Application No. 2015-121393 filed in Japan on Jun. 16, 2015, the entire contents of which are incorporated herein by this reference.

BACKGROUND OF THE INVENTION

1. Field of the Invention

The present invention relates to an image pickup apparatus, an image pickup method, and a recording medium for performing pixel shifts and generating high-quality combined image data.

2. Description of the Related Art

There has been proposed a technique for combining a plurality of image data, which are acquired by performing pixel shifts with a movement amount non-integer times as large as a pixel pitch, and generating high-quality combined image data. As a specific example, there has been known a technique for sequentially performing pixel shifts in a basic unit of 0.5 pixel pitch in a horizontal direction and a vertical direction, acquiring eight images in different image pickup positions, and combining the acquired eight images to thereby generate high-resolution combined image data having double resolution in the horizontal direction and the vertical direction compared with one image.

In such techniques, it is necessary to highly accurately execute pixel shifts among a plurality of images to be combined. Further, consistency is required among the plurality of images.

Therefore, a user checks an acquired combined image and, when the combined image is not an image having desired image quality, performs re-photographing according to necessity.

In the re-photographing led by the user, the user needs to, for example, check the combined image and perform operation for the re-photographing. Therefore, as an automation technique for reducing a burden on the user, for example, Japanese Patent Application Laid-Open Publication No. H7-177424 describes a technique for detecting vibration in pixel shift photographing and repeatedly performing re-exposure until a necessary number of images suitable for combination are photographed.

SUMMARY OF THE INVENTION

An image pickup apparatus according to an aspect in the present invention includes: an image pickup device including a plurality of pixels two-dimensionally arrayed at a predetermined pixel pitch and configured to receive a light beam, pick up an image, and acquire the image; a pixel shift circuit configured to perform a pixel shift for changing a pixel shift position, which is a relative position in a direction of the two-dimensional array of the image pickup device and the light beam received by the image pickup device; and a control circuit configured to cause the pixel shift circuit to perform pixel shifts to a plurality of different pixel shift positions and cause the image pickup device to perform the image pickup in the each of the pixel shift positions and acquire a plurality of images. The control circuit controls the pixel shift circuit to perform the pixel shift in pixel shift order in which an image higher in image quality than one image acquired from the image pickup device can be composed even when, partway in the image pickup of a predetermined number of the images necessary for composing an image having predetermined high image quality, image processing is performed on the basis of two or more images less than the predetermined number.

An image pickup method according to another aspect of the present invention includes: a pixel shift step for performing, to a plurality of different pixel shift positions, pixel shifts for changing pixel shift positions, which are relative positions of an image pickup device including a plurality of pixels two-dimensionally arrayed at a predetermined pixel pitch and a light beam received by the image pickup device, in a direction of the two-dimensional array; and an image pickup step for causing the image pickup device to receive the light beam and perform the image pickup in the respective plurality of different pixel shift positions and acquire a plurality of images. The pixel shift step is a step for performing the pixel shifts in pixel shift order in which an image higher in image quality than one image acquired from the image pickup device can be composed even when, partway in the image pickup of a predetermined number of the images necessary for composing an image having predetermined high image quality, image processing is performed on the basis of two or more images less than the predetermined number.

A recording medium according to another aspect of the present invention is a non-transitory computer-readable medium storing a processing program for causing a computer to execute: a pixel shift step for performing, to a plurality of different pixel shift positions, pixel shifts for changing pixel shift positions, which are relative positions of an image pickup device including a plurality of pixels two-dimensionally arrayed at a predetermined pixel pitch and a light beam received by the image pickup device, in a direction of the two-dimensional array; and an image pickup step for causing the image pickup device to receive the light beam and perform the image pickup in the respective plurality of different pixel shift positions and acquire a plurality of images. The pixel shift step is a step for performing the pixel shifts in pixel shift order in which an image higher in image quality than one image acquired from the image pickup device can be composed even when, partway in the image pickup of a predetermined number of the images necessary for composing an image having predetermined high image quality, image processing is performed on the basis of two or more images less than the predetermined number.

BRIEF DESCRIPTION OF THE DRAWINGS

FIG. 7 is a diagram showing types of complementation performed by the respective combination processing sections and a demosaicking processing section and obtained resolution in the first embodiment;

FIG. 27 is a diagram showing types of complementation performed by respective combination processing sections and a demosaicking processing section and obtained resolution in a third embodiment of the present invention;

DETAILED DESCRIPTION OF THE PREFERRED EMBODIMENTS

Embodiments of the present invention are explained below with reference to the drawings.

First Embodiment

Figure 1:
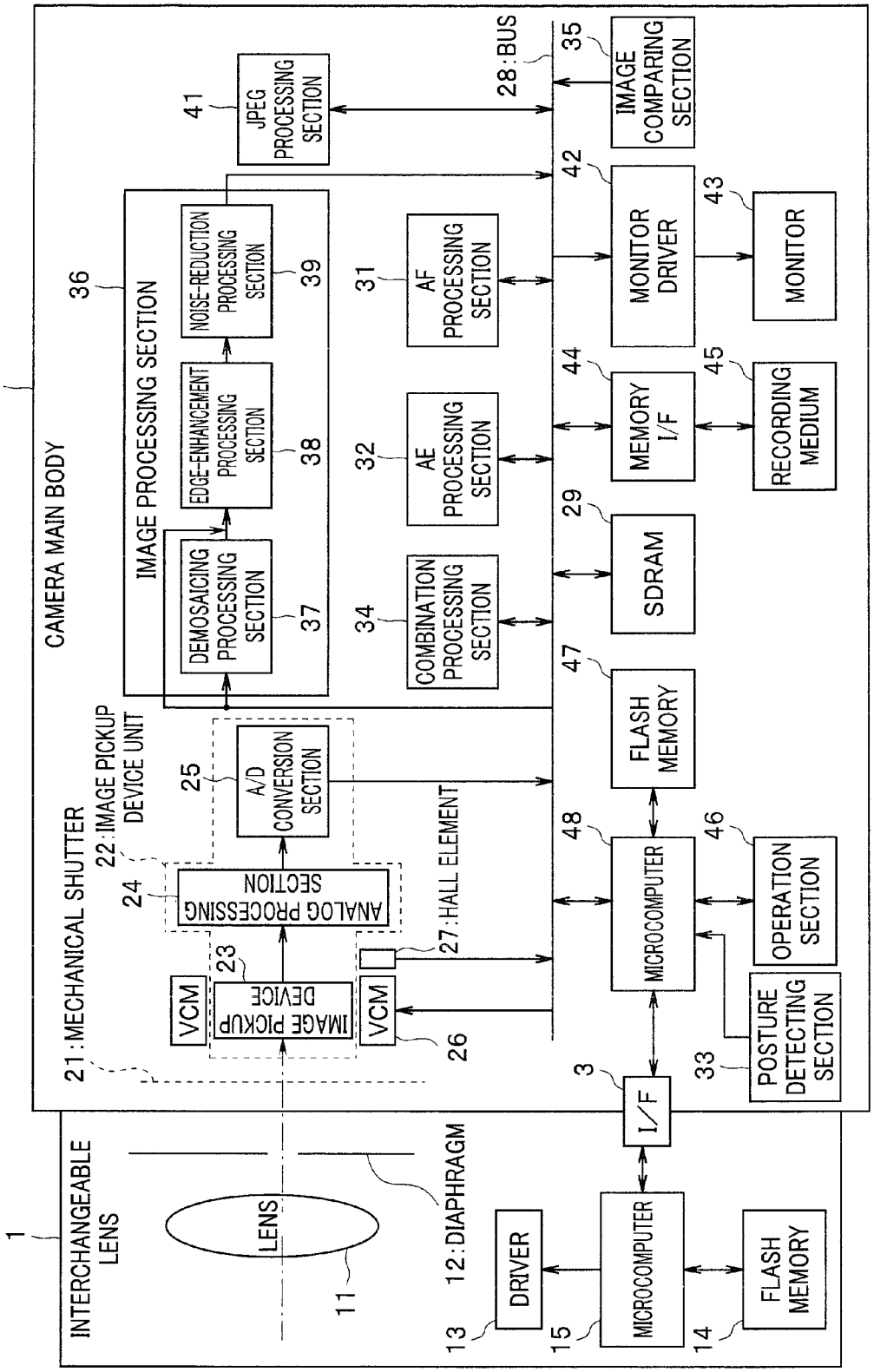
FIG. 1 is a block diagram showing a configuration of a digital camera in a first embodiment of the present invention.

FIGS. 1 to 25 show a first embodiment of the present invention. FIG. 1 is a block diagram showing a configuration of a digital camera. Note that, in the present embodiment, the digital camera is explained as an example of an image pickup apparatus. However, the image pickup apparatus is not limited to the digital camera and may be any apparatus as long as the apparatus includes an image pickup function.

The digital camera is configured by communicably connecting an interchangeable lens 1 and a camera main body 2 via an interface (I/F) 3.

The interchangeable lens 1 is detachably attached to the camera main body 2 via, for example, a lens mount. The interface 3 is configured by electric contacts formed in the lens mount (an electric contact provided on the interchangeable lens 1 side and an electric contact provided on the camera main body 2 side). The interchangeable lens 1 is capable of communicating with the camera main body 2 via the interface 3.

The interchangeable lens 1 includes a lens 11, a diaphragm 12, a driver 13, a flash memory 14, and a microcomputer 15.

The lens 11 is a photographing optical system for forming an optical image of an object on an image pickup device 23 explained below of the camera main body 2.

The diaphragm 12 is an optical diaphragm that controls a passing range of a light beam traveling from the lens 11 to the image pickup device 23.

The driver 13 drives the lens 11 to perform adjustment of a focus position on the basis of a command from the microcomputer 15. When the lens 11 is an electric zoom lens or the like, the driver 13 further performs a change of a focal length. In addition, the driver 13 drives the diaphragm 12 to change an opening diameter on the basis of a command from the microcomputer 15. According to the driving of the diaphragm 12, brightness of the optical image of the object changes and size of a blur and the like also change. Note that, in acquiring a plurality of image data while performing pixel shifts in a pixel shift super-resolution photographing mode explained below, the diaphragm 12 is maintained without being driven from a point in time before a first image is acquired to a point in time after a last image is acquired. This is for the purpose of preventing vibration at time when the diaphragm 12 is driven from being affecting pixel shift positions.

The flash memory 14 is a storage medium that stores a control program executed by the microcomputer 15 and various kinds of information concerning the interchangeable lens 1.

The microcomputer 15 is a so-called lens-side computer and connected to the driver 13, the flash memory 14, and the interface 3. The microcomputer 15 communicates with a microcomputer 48, which is a main body-side computer explained below, via the interface 3, receives a command from the microcomputer 48, performs readout/writing of the information stored in the flash memory 14, and controls the driver 13. Further, the microcomputer 15 transmits the various kinds of information concerning the interchangeable lens 1 to the microcomputer 48.

The interface 3 connects the microcomputer 15 of the interchangeable lens 1 and the microcomputer 48 of the camera main body 2 to be capable of performing bidirectional communication.

The camera main body 2 includes a mechanical shutter 21, an image pickup device unit 22, a voice coil motor (VCM) 26, a Hall element 27, a bus 28, an SDRAM 29, an AF processing section 31, an AE processing section 32, a posture detecting section 33, a combination processing section 34, an image comparing section 35, an image processing section 36, a PEG processing section 41, a monitor driver 42, a monitor 43, a memory interface (memory I/F) 44, a recording medium 45, an operation section 46, a flash memory 47, and the microcomputer 48.

The mechanical shutter 21 controls time in which a light beam from the lens 11 reaches the image pickup device 23. The mechanical shutter 21 is, for example, an optical shutter configured to cause a shutter curtain to travel. The mechanical shutter 21 is driven by a command of the microcomputer 48. The mechanical shutter 21 controls a reaching time of the light beam to the image pickup device 23 and an exposure time of the object by the image pickup device 23.

Note that, when a plurality of image data are acquired while pixel shifts are performed in the pixel shift super-resolution photographing mode explained below, the mechanical shutter 21 is maintained in an open state from a point in time before first image data is acquired to a point in time after last image data is acquired. Therefore, an electronic shutter by the image pickup device 23 is used for acquisition of a plurality of image data. This is for the purpose of preventing vibration at time when the mechanical shutter 21 is opened and closed from being affecting pixel shift positions. Further, this is for the purpose of, by reducing a blank time in which exposure is not performed among exposure times of the respective image data, reducing, as much as possible, time in which a predetermined number of image data necessary for composing an image having predetermined high image quality are acquired.

The image pickup device unit 22 includes an image pickup device 23, an analog processing section 24, and an analog/digital conversion section (A/D conversion section) 25. That is, the image pickup device unit 22 in the present embodiment is configured as a digital image pickup device unit that outputs digital image data. However, a configuration may be adopted in which the image pickup device unit 22 is configured as an analog image pickup device unit including the image pickup device 23 and the analog processing section 24 and the analog/digital conversion section (A/D conversion section) 25 are provided on an outside of the analog image pickup device unit.

The image pickup device 23 includes a plurality of pixels two-dimensionally arrayed at a predetermined pixel pitch. The image pickup device 23 receives a light beam from the lens 11 and the diaphragm 12 and picks up an image (that is, photoelectrically converts a formed optical image of an object) and generates an analog image signal on the basis of control by the microcomputer 48, which is an image-pickup control section. The image pickup device 23 is disposed to set a surface perpendicular to an optical axis of the lens 11 as a light receiving surface. Therefore, a two-dimensional array direction of a plurality of pixels is a direction perpendicular to the optical axis of the lens 11.

The image pickup device 23 in the present embodiment is configured by disposing a color filter of a plurality of colors including a luminance equivalent color (e.g., G (green) containing a luminance component most) such that one color corresponds to one pixel. More specifically, the image pickup device 23 is configured as a single plate-type image pickup device in which a color filter of a primary color Bayer array (an R (red) G (green) B (blue) Bayer array) is disposed on front surfaces of a plurality of pixels arrayed in a vertical direction and a horizontal direction. Note that, naturally, the image pickup device 23 is not limited to the single plate-type image pickup device. The image pickup device 23 may be, for example, a stacked-type image pickup device in which color components are separated in a substrate thickness direction.

The analog processing section 24 performs, after reducing reset noise and the like, waveform shaping on the analog image signal read out from the image pickup device 23 and further performs gain-up to obtain target brightness.

The A/D conversion section 25 converts the analog image signal outputted from the analog processing section 24 into a digital image signal (referred to as image data as appropriate).

The voice coil motor (VCM) 26 is a pixel shift section that performs pixel shifts for changing pixel shift positions such that relative positions (pixel shift positions) in the two-dimensional array direction of the image pickup device unit 22 including the image pickup device 23 and a light beam received by the image pickup device 23 of the image pickup device unit 22 change to a plurality of relative positions with different movement amounts including relative positions with a movement amount non-integer times as large as a pixel pitch (e.g., in half-pixel pitch unit). A plurality of images photographed in the plurality of relative positions with the different movement amounts are images used for combination processing for obtaining a combined image higher in image quality than image data obtained from the image pickup device 23.

More specifically, the voice coil motor (VCM) 26 floats the image pickup device unit 22 in the air with magnetism and moves a position by controlling the magnetism. Note that the voice coil motor (VCM) 26 is explained as an example of the pixel shift section. However, the pixel shift section is not limited to the voice coil motor (VCM) 26. A pixel shift section having an appropriate configuration including another driving source and the like may be adopted.

In the configuration example shown in FIG. 1, the image pickup device unit 22 is moved by the voice coil motor (VCM) 26, which is the pixel shift section. However, the lens 11 may be moved or both of the image pickup device unit 22 and the lens 11 may be moved.

The Hall element 27 is a pixel-shift-position detecting section that detects, in time series, pixel shift positions during a photographing operation of the image pickup device unit 22 moved by the voice coil motor (VCM) 26. The Hall element 27 is used as the pixel-shift-position detecting section. However, naturally, the pixel-shift-position detecting section is not limited to the Hall element 27.

In the present embodiment, since the image pickup device unit 22 is moved by the voice coil motor (VCM) 26, a position of the image pickup device unit 22 is detected by the Hall element 27. However, when lens 11 is moved by the voice coil motor (VCM) 26, a position of the lens 11 is detected by the Hall element 27. Similarly, when both of the image pickup device unit 22 and the lens 11 are moved by the voice coil motor (VCM) 26, both of the Hall element 27 that detects the position of the image pickup device unit 22 and the Hall element 27 that detects the position of the lens 11 are provided.

The bus 28 is a transfer path for transferring various data and control signals generated in a certain place in the digital camera to other places in the digital camera. The bus 28 in the present embodiment is connected to the A/D conversion section 25, the voice coil motor (VCM) 26, the Hall element 27, the SDRAM 29, the AF processing section 31, the AE processing section 32, the combination processing section 34, the image comparing section 35, the image processing section 36, the JPEG processing section 41, the monitor driver 42, the memory I/F 44, and the microcomputer 48.

Image data (referred to as RAW image data as appropriate below) outputted from the A/D conversion section 25 of the image pickup device unit 22 is transferred via the bus 28 and once stored in the SDRAM 29.

The SDRAM 29 is a storing section that temporarily stores the RAW image data or various data such as image data processed in the combination processing section 34, the image processing section 36, the JPEG processing section 41, and the like.

The AF processing section 31 extracts a signal of a high-frequency component from the RAW image data and acquires a focus evaluation value through AF (autofocus) integration processing. The acquired focus evaluation value is used for AF driving of the lens 11. Note that, naturally, AF is not limited to such contrast AF. For example, phase difference AF may be performed using a dedicated AF sensor (or pixels for AF on the image pickup device 23).

The AE processing section 32 calculates object luminance on the basis of the RAW image data. The calculated object luminance is used for automatic exposure (AE) control, that is, control of the diaphragm 12 and control of the mechanical shutter 21, exposure timing control for the image pickup device 23 (or control of a so-called electronic shutter), and the like. Note that the RAW image data is used as data for calculating the object luminance. However, instead of the RAW image data, data obtained by providing a dedicated photometry sensor in the digital camera may be used.

The posture detecting section 33 is a movement detecting section including a gyro sensor or the like for detecting a movement of the digital camera. The posture detecting section 33 outputs a detection result to the microcomputer 48.

The combination processing section 34 is an image combining section that combines a plurality of image data acquired in a plurality of different pixel shift positions to thereby compose combined image data higher in image quality than one image data acquired from the image pickup device 23. A combined image has high image quality because the number of pixels is the same as the number of pixels of an image obtained by subjecting photographed one image to image processing but defective pixels in a pixel array are few (or no defective pixels are present) in some case and has high image quality because the number of pixels increase in other cases. The image having high resolution because of the increase in the number of pixels is referred to as super-resolution image as appropriate.

The image comparing section 35 functions as both of an environmental-light detecting section that detects a change in light radiated on the object (e.g., flicker) and an object-blur detecting section that detects movement of the object in an acquired plurality of images. The image comparing section 35 detects a change in environmental light and an object blur by comparing a plurality of image data and outputs a detection result to the microcomputer 48. Consequently, the microcomputer 48 can determine whether image data inappropriate for image composition is acquired.

The image processing section 36 performs various kinds of image processing on the RAW image data or the combined image data generated by the combination processing section 34. The image processing section 36 includes a demosaicking processing section 37, an edge-enhancement processing section 38, and a noise-reduction processing section 39.

The demosaicking processing section 37 performs demosaicking processing for converting image data of an RGB Bayer array, in which only one color component among RGB components is present for one pixel, into image data of RGB three surfaces, in which all pixels include all three color components of RGB, by calculating a color component absent in a pixel of attention from peripheral pixels through complementation.

The edge-enhancement processing section 38 performs edge enhancement processing on the image data.

The noise-reduction processing section 39 performs noise reduction processing by performing, on the image data, coring processing or the like corresponding to a space frequency.

The image data after being subjected to the various kinds of processing by the image processing section 36 is stored in the SDRAM 29 again.

When recording image data, the JPEG processing section 41 reads out image data from the SDRAM 29, compresses the read-out image data according to a JPEG compression method, and causes the SDRAM 29 to once store the compressed image data. The compressed image data stored in the SDRAM 29 is added with a header necessary for configuring a file and aligned as data for recording by the microcomputer 48. The aligned data for recording is recorded in the recording medium 45 via the memory I/F 44 on the basis of control by the microcomputer 48.

The JPEG processing section 41 also performs expansion of the read-out image data. That is, when reproduction of a recorded image is performed, for example, a JPEG file is read out from the recording medium 45 via the memory I/F 44 and temporarily stored in the SDRAM 29 on the basis of control by the microcomputer 48. The JPEG processing section 41 reads out JPEG image data stored in the SDRAM 29, expands the read-out JPEG image data according to a JPEG expansion method, and causes the SDRAM 29 to store the expanded image data.

The monitor driver 42 reads out the image data stored in the SDRAM 29, converts the read-out image data into a video signal, and controls to drive the monitor 43 to cause the monitor 43 to display an image based on the video signal. The image display performed by the monitor driver 42 includes rec-view display for displaying image data immediate after photographing for a short time, reproduction display of the JPEG file recorded in the recording medium 45, and live-view display.

The monitor 43 displays the image and displays various kinds of information related to the digital camera according to the driving control by the monitor driver 42 explained above.

The memory I/F 44 is a recording control section that performs control for recording the image data in the recording medium 45 and also performs readout of the image data from the recording medium 45.

The recording medium 45 is a recording section that stores the image data in a nonvolatile manner. The recording medium 45 is configured by, for example, a memory card detachably attached to the camera main body 2. However, the recording medium 45 is not limited to the memory card and may be a disk-like recording medium or may be any other recording media Therefore, the recording medium 45 does not need to be a component peculiar to the digital camera.

The operation section 46 is a section for performing various operation inputs to the digital camera. The operation section 46 includes operation buttons such as a power button for turning on and off a power supply of the digital camera, a release button including two-stage operation buttons configured by, for example, a first release switch and a second release switch for instructing a photographing start of an image, a reproduction button for performing reproduction of a recorded image, a menu button for performing, for example, setting of the digital camera, a cross key used for selection operation for an item, and an OK button used for decision operation for the selected item. Items that can be set using the menu button, the cross key, the OK button, and the like include photographing modes (a normal photographing mode, a pixel shift super-resolution photographing mode, etc.), recording modes (a JPEG recording mode, a RAW+JPEG recording mode, etc.) and the like. When operation is performed on the operation section 46, a signal corresponding to operation content is outputted to the microcomputer 48.

The flash memory 47 is a storage medium that stores, in a nonvolatile manner, a processing program executed by the microcomputer 48 and various kinds of information related to the digital camera. Several examples of the information stored by the flash memory 47 include various parameters necessary for an operation of the digital camera such as parameters used for the edge enhancement processing and parameters used for the noise reduction processing, information such as sizes, directions, and order of pixel shifts in the pixel shift super-resolution photographing mode, and a manufacturing number for specifying the digital camera. The information stored by the flash memory 47 is read by the microcomputer 48.

The microcomputer 48 is a control section that controls the respective sections in the camera main body 2, transmits a command to the microcomputer 15 via the interface 3 and controls the interchangeable lens 1, and comprehensively controls the digital camera. When an operation input is performed from the operation section 46 by the user, the microcomputer 48 reads, according to the processing program stored in the flash memory 47, parameters necessary for processing from the flash memory 47 and executes various sequences corresponding to operation content.

The microcomputer 48, which is the control section, also functions as an image-pickup control section that, in particular, causes the voice coil motor (VCM) 26 to perform pixel shifts to a plurality of different pixel shift positions and causes the image pickup device 23 to perform image pickup in the respective pixel shift positions and acquire a plurality of image data.

At this point, as explained below, the microcomputer 48 controls the voice coil motor (VCM) 26 to perform the pixel shifts in pixel shift order in which an image higher in image quality than one image acquired from the image pickup device can be composed even when, partway in the image pickup of a predetermined number of the images necessary for composing an image having predetermined high image quality, image processing is performed on the basis of two or more images less than the predetermined number.

All of the Hall element 27, the posture detecting section 33, and the image comparing section 35 configure a detecting section that detects whether a defective image inappropriate as an image used for composing a high-quality image occurs while the predetermined number of images are acquired. Note that all of the sections may be used as the detecting section or one or more of the sections may be used as the detecting section.

Therefore, the microcomputer 48 determines, on the basis of whether a shift exceeding an allowable range is present in a position detected by the Hall element 27, on the basis of whether a movement equal to or larger than a predetermined amount of the digital camera is detected by the posture detecting section 33, and on the basis of whether a change in environmental light and an object blur are detected by the image comparing section 35, whether image data inappropriate for image composition is acquired. When detecting that a defective image occurs, the microcomputer 48 performs, as explained below, control different from control performed when occurrence of a defective image is not detected.

Figure 2:
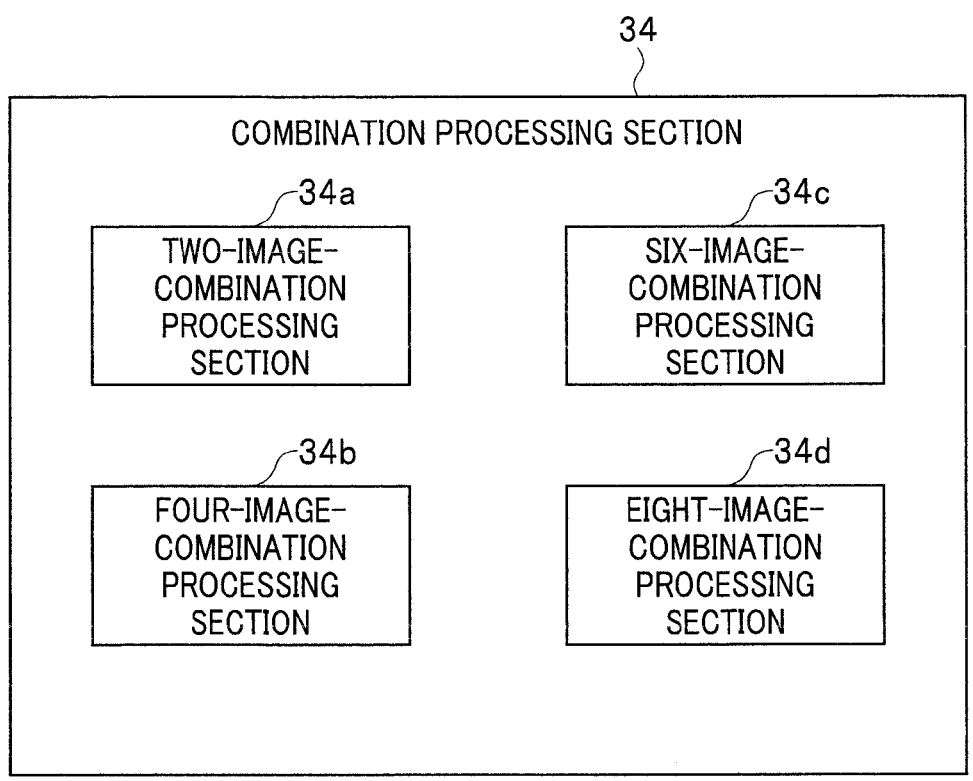
FIG. 2 is a block diagram showing a configuration of a combination processing section in the first embodiment.

FIG. 2 is a block diagram showing the configuration of the combination processing section 34.

A plurality of kinds of the combination processing section 34 are provided according to based on how many images from a first image a high-quality image is composed.

That is, the combination processing section 34 includes a two-image-combination processing section 34a that combines, on the basis of two image data acquired from the image pickup device 23, an image higher in image quality than one image acquired from the image pickup device 23 and a four-image-combination processing section 34b that composes an image on the basis of four image data in the same manner, a six-image-combination processing section 34c that composes an image on the basis of six image data, and an eight-image-combination processing section 34d that composes an image on the basis of eight image data.

As explained with reference to FIG. 25 below, the microcomputer 48 selects, according to which image a defective image detected first by the detecting section is, a type of the combination processing section, that is, which of the combination processing sections 34a to 34d is used and causes the selected combination processing section to perform processing.

Figure 3:
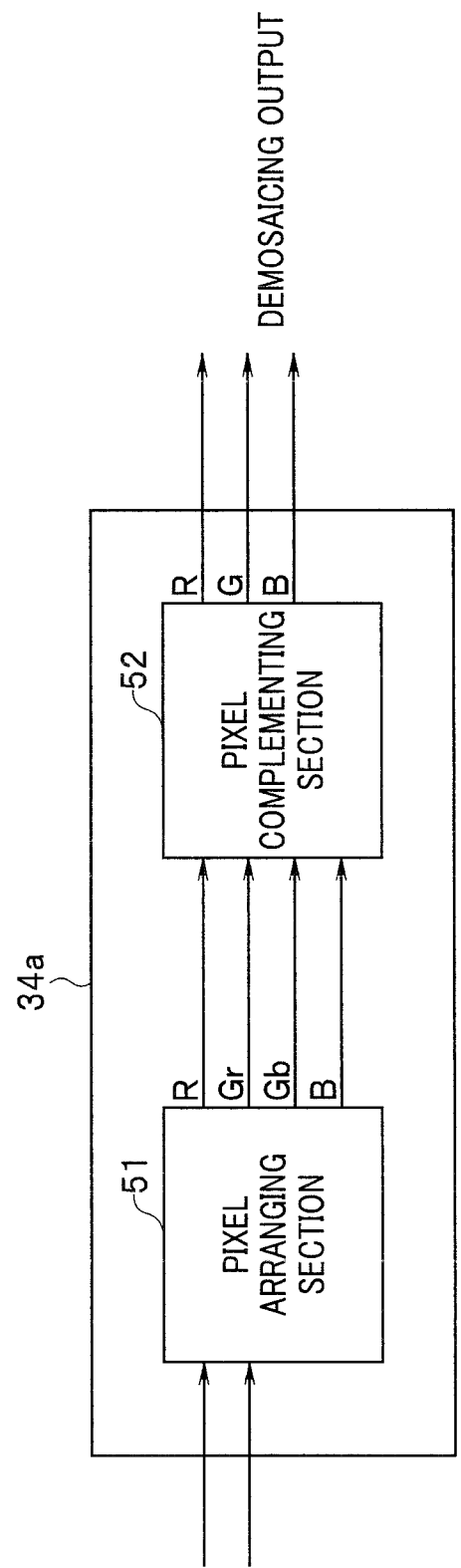
FIG. 3 is a block diagram showing a configuration of a two-image-combination processing section in the first embodiment.

FIG. 3 is a block diagram showing a configuration of the two-image-combination processing section 34a.

The two-image-combination processing section 34a includes a pixel arranging section 51 that arranges respective pixels of inputted two image data at resolution same as resolution of the image pickup device 23 (hereinafter referred to as 1×1 resolution as appropriate) and a pixel complementing section 52 that complements a pixel in a pixel position where a lack occurs in a pixel array of the same color component of the image data arranged by the pixel arranging section 51.

Note that Gr pixels are G pixels arranged on the same line as R pixels in an RGB Bayer array and Gb pixels are G pixels arranged on the same line as B pixels in the RGB Bayer array. When being outputted from the pixel complementing section 52, the Gr pixels and the Gb pixels are simply outputted as the G pixels without being distinguished.

Figure 4:
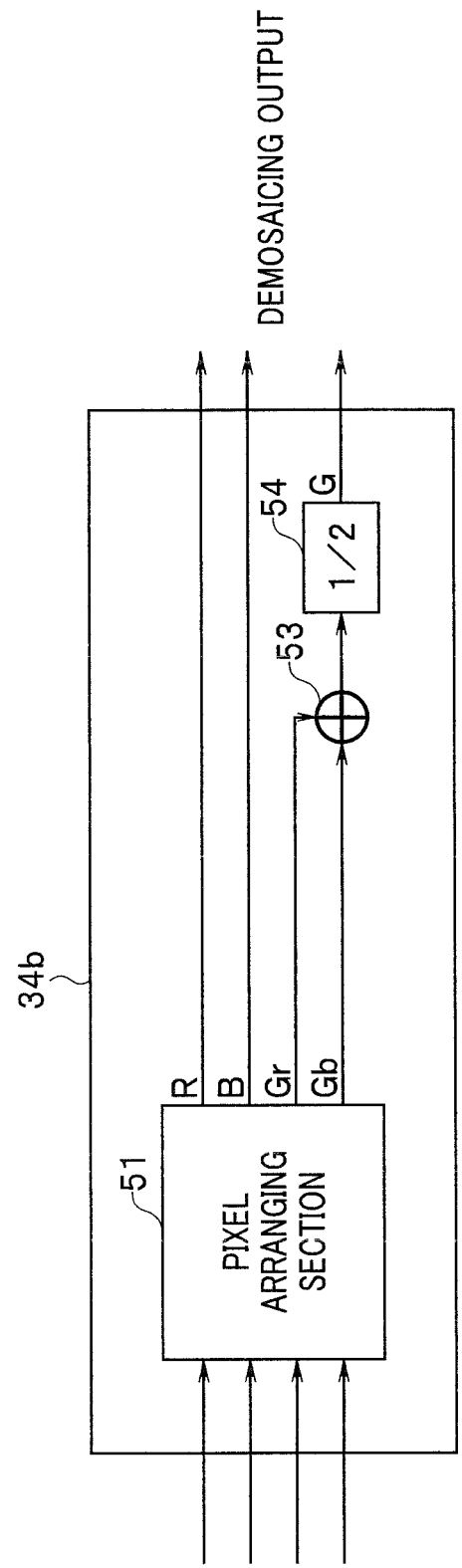
FIG. 4 is a block diagram showing a configuration of a four-image-combination processing section in the first embodiment.

FIG. 4 is a block diagram showing a configuration of the four-image-combination processing section 34*b*.

The four-image-combination processing section 34*b* includes the pixel arranging section 51 that arranges respective pixels of inputted four image data at resolution same as the resolution of the image pickup device 23 (1×1 resolution), an adding section 53 that adds up the Gr pixels and the Gb pixels in the same pixel positions in the image data arranged by the pixel arranging section 51, and a dividing section 54 that halves pixel values added up by the adding section 53 and outputs the pixel values as G pixels. An averaging section is configured by the adding section 53 and the dividing section 54. The G pixels outputted from the dividing section 54 are averages of the Gr pixels and the Gb pixels in the same pixel positions.

Figure 5:
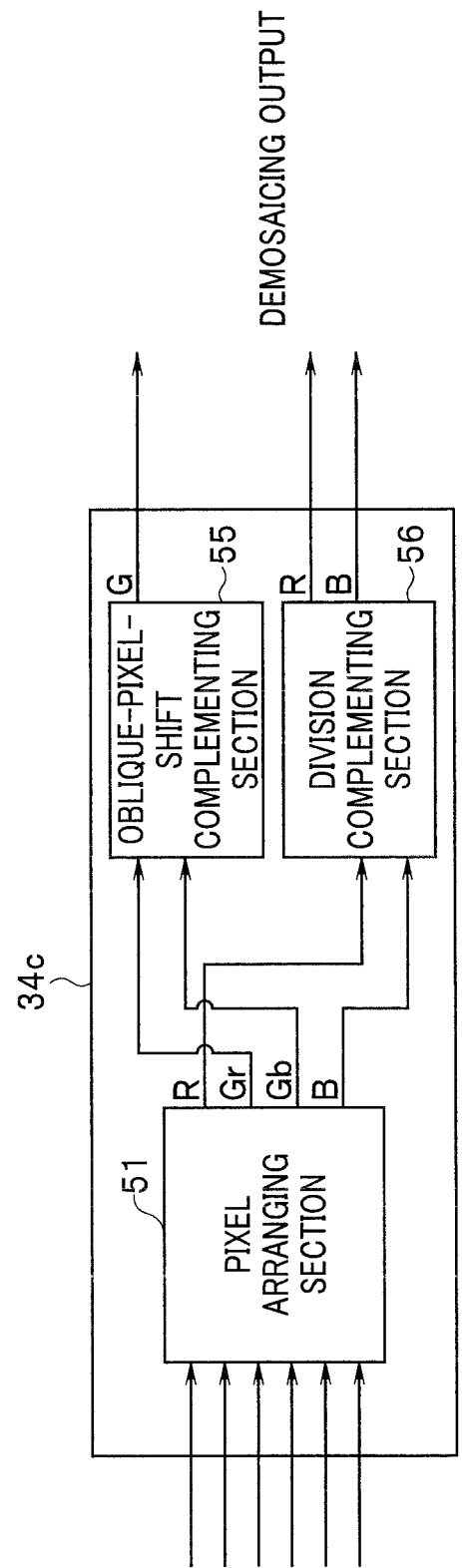
FIG. 5 is a block diagram showing a configuration of a six-image-combination processing section in the first embodiment.

FIG. 5 is a block diagram showing a configuration of a six-image-combination processing section 34*c*.

The six-image-combination processing section 34*c* includes the pixel arranging section 51 that arranges respective pixels of inputted six image data according to pixel shift positions, an oblique-pixel-shift complementing section 55 that performs oblique pixel shift complementation on the Gr pixels and the Gb pixels in the image data arranged by the pixel arranging section 51 and outputs the Gr pixels and the Gb pixels as the G pixels, and a division complementing section 56 that performs division complementation on each of the R pixels and the B pixels in the image data arranged by the pixel arranging section 51.

The oblique-pixel-shift complementing section 55 performs processing for performing oblique pixel shift complementation explained below to create a super-resolution image having resolution twice as high as the resolution of the image pickup device 23 longitudinally and laterally (referred to as 2×2 resolution below as appropriate). The division complementing section 56 performs processing for copying the R and B pixels having the resolution of the image pickup device 23 to four pixel positions having resolution twice as high as the resolution of the image pickup device 23 longitudinally and laterally (2×2 resolution) and generating R and B components of the 2×2 number of pixels.

Figure 6:
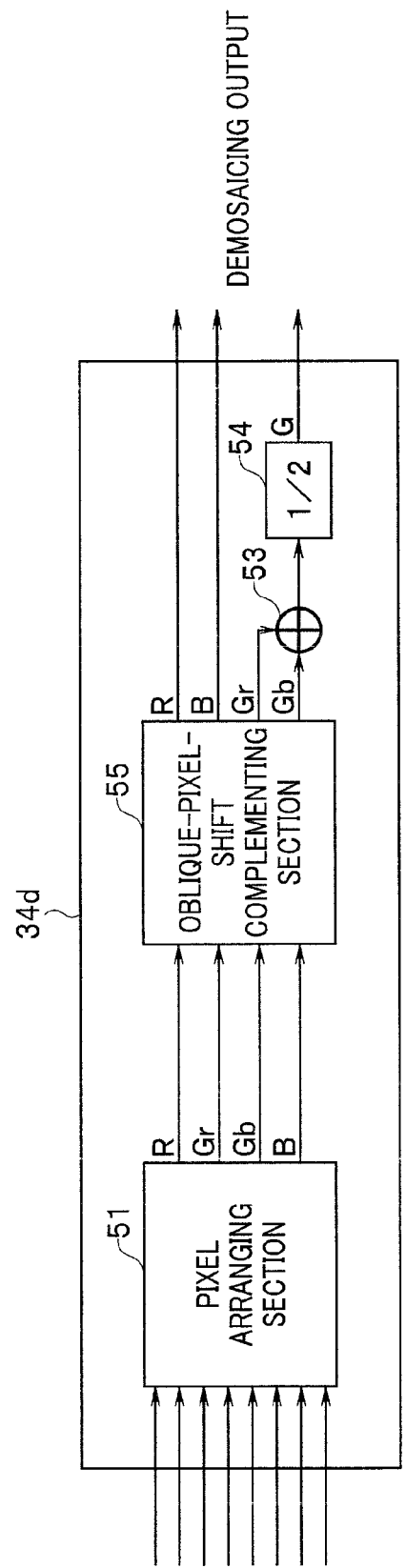
FIG. 6 is a block diagram showing a configuration of an eight-image-combination processing section in the first embodiment.

FIG. 6 is a block diagram showing a configuration of the eight-image-combination processing section 34*d*.

The eight-image-combination processing section 34*d* includes the pixel arranging section 51 that arranges respective pixels of inputted eight image data according to pixel shift positions, the oblique-pixel-shift complementing section 55 that performs oblique pixel shift complementation on each of the Gr pixels, the Gb pixels, the R pixels, and the B pixels of the image data arranged by the pixel arranging section 51 and outputs Gr pixels, the Gb pixels, the R pixels, and the B pixels, the adding section 53 that adds up the Gr pixels and the Gb pixels in the same pixel positions in the image data complemented by the oblique-pixel-shift complementing section 55, and the dividing section 54 that halves pixel values added up by the adding section 53 and outputs the pixel values as the G pixels. As explained above, an averaging section is configured by the adding section 53 and the dividing section 54. The G pixels outputted from the dividing section 54 are averages of the Gr pixels and the Gb pixels in the same pixel positions.

FIG. 7 is a diagram showing types of complementation performed by the respective combination processing sections 34*a* to 34*d* and the demosaicking processing section 37 and obtained resolution.

"Pixel complementation" means that a pixel in a pixel position where a lack occurs in a pixel array of the same color component is complemented. "No complementation" means that the complementation is not performed. "Pixel complementation" is performed by the pixel complementing section 52 or the demosaicking processing section 37.

"Oblique pixel shift complementation" is complementation performed on at least luminance equivalent components (G components) (or further on R components and B components) when a super-resolution image is obtained. "Oblique pixel shift complementation" is performed by the oblique-pixel-shift complementing section 55.

Further, "division complementation" is complementation performed on components (the R components and the B components) other than the luminance equivalent components according to necessity when a super-resolution image is obtained. "Division complementation" is performed by the division complementing section 56.

To obtain images to be recorded in the recording medium 45 from only one image acquired from the image pickup device 23, as in the case of the normal photographing mode for photographing the images one by one, the demosaicking processing section 37 performs demosaicking processing for calculating a color component absent in a pixel of attention in the RGB Bayer array from peripheral pixels through pixel complementation. Therefore, an image obtained as a result of the processing is an image having resolution (1×1 resolution) same as the resolution of the image pickup device 23.

As explained below, the processing by the two-image-combination processing section 34*a* is performed on first to second images pixel-shifted by an amount integer times (not including non-integer times) as large as a pixel pitch. Concerning the G pixels, since there is no lost pixel, it is unnecessary to perform the pixel complementation. Concerning the R pixels and the B pixels, the pixel complementation is respectively performed.

Further, as explained below, the processing by the four-image-combination processing section 34*b* is performed on first to fourth images pixel-shifted by an amount integer times (not including non-integer times) as large as a pixel pitch. Concerning all of the R pixels, the G pixels, and the B pixels, since there is no lost pixel, it is unnecessary to perform the pixel complementation.

As explained below, the processing by the six-image-combination processing section 34*c* is performed concerning the first to sixth images pixel-shifted to include a pixel shift of non-integer times as large as a pixel pitch. Concerning the G pixels, the oblique pixel shift complementation is performed. Concerning the R pixels and the B pixels, the division complementation is respectively performed.

In addition, as explained below, the processing by the eight-image-combination processing section 34*d* is performed on first to eighth images pixel-shifted to include a pixel shift of non-integer times as large as a pixel pitch. Concerning each of the Gr pixels, the Gb pixels, the R pixels, and the B pixels, the oblique pixel shift complementation is performed.

Figure 8:
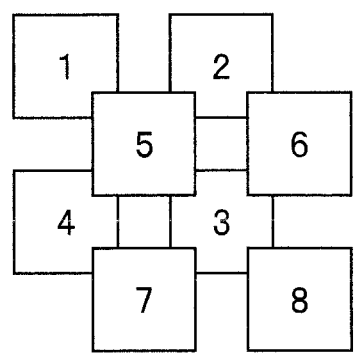
FIG. 8 is a diagram showing a first example of pixel shift order in the first embodiment.
Figure 9:
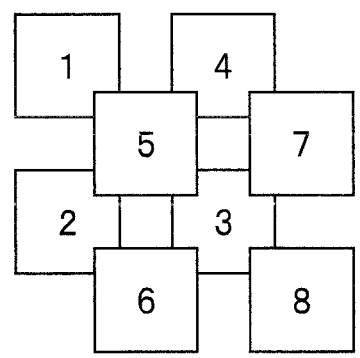
FIG. 9 is a diagram showing a second example of the pixel shift order in the first embodiment.

FIG. 8 is a diagram showing a first example of pixel shift order. FIG. 9 is a diagram showing a second example of the pixel shift order.

In both of the first example and the second example, first to fourth image data are acquired by performing only pixel shifts in units of an integer pixel pitch in both of a longitudinal direction and a lateral direction. Fifth to eighth image data are acquired by performing pixel shifts on the first image data in units of a half integer pixel pitch in the longitudinal direction and a half integer pixel pitch in the lateral direction. In the following explanation, a pixel array of image data, a pixel shift amount of which from an initial position (first image data) is in the integer pixel pitch units in both of the longitudinal direction and the lateral direction, is referred to as basic array as appropriate and a pixel array of image data, a pixel shift amount of which from the initial position is the half integer pixel pitch units in both of the longitudinal direction and the lateral direction, is referred to as shifted array as appropriate.

In the first example shown in FIG. 8, after a first image is acquired in an initial position, the first image is shifted by one pixel pitch to the right to acquire a second image, the second image is shifted by one pixel pitch downward to acquire a third image, the third image is shifted by one pixel pitch to the left to acquire a fourth image, after the fourth image is shifted by one pixel pitch upward and returned to a position of the first image (the initial position), the fourth image is shifted by 0.5 pixel pitch to the right and 0.5 pixel pitch downward (i.e., actually shifted by 1/√2 pixel pitch to the right and downward (the same applies as appropriate below)) to acquire a fifth image, the fifth image is shifted by one pixel pitch to the right to acquire a sixth image, the sixth image is shifted by one pixel pitch downward and one pixel pitch to the left to acquire a seventh image, and the seventh image is shifted by one pixel pitch to the right to acquire an eighth image.

In the second example shown in FIG. 9, after a first image is acquired in an initial position, the first image is shifted by one pixel pitch downward to acquire a second image, the second image is shifted by one pixel pitch to the right to acquire a third image, the third image is shifted by one pixel pitch upward to acquire a fourth image, after the fourth image is shifted by one pixel pitch to the left and returned to a position of the first image (the initial position), the fourth image is shifted by 0.5 pixel pitch to the right and 0.5 pixel pitch downward to acquire a fifth image, the fifth image is shifted by one pixel pitch downward to acquire a sixth image, the sixth image is shifted by one pixel pitch to the right and one pixel pitch upward to acquire a seventh image, and the seventh image is shifted by one pixel pitch downward to acquire an eighth image.

In both of the examples shown in FIGS. 8 and 9, after the eighth image is acquired, processing for returning the eighth image to the initial position to prepare for the next photographing is performed.

Note that the order of the first to fourth images shown in FIG. 8 and the order of the fifth to eighth images shown in FIG. 9 may be combined. Alternatively, the order of the first to fourth images shown in FIG. 9 and the order of the fifth to eighth images shown in FIG. 8 may be combined.

In the present embodiment, an image to be recorded in the recording medium 45 is generated at a point in time when any one of the first, second, fourth, sixth, and eighth images is obtained. Therefore, in all of the examples shown in FIGS. 8 and 9 and the examples explained as the combinations of the examples, the acquisition order of the third and fourth images may be reversed, the acquisition order of the fifth and sixth images may be reversed, and the acquisition order of the seventh and eighth images may be reversed.

Figure 24:
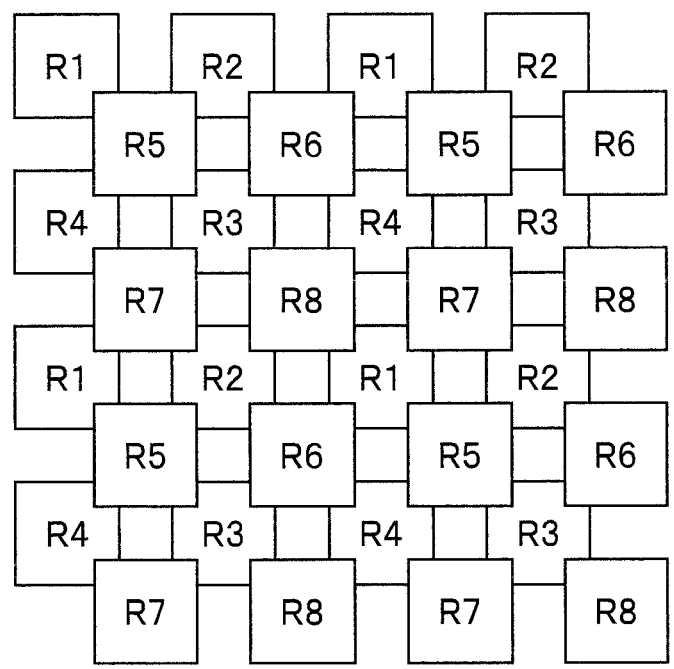
FIG. 24 is a diagram showing an array of R pixels obtained as a result of performing an eighth pixel shift in the first embodiment.
Figure 25:
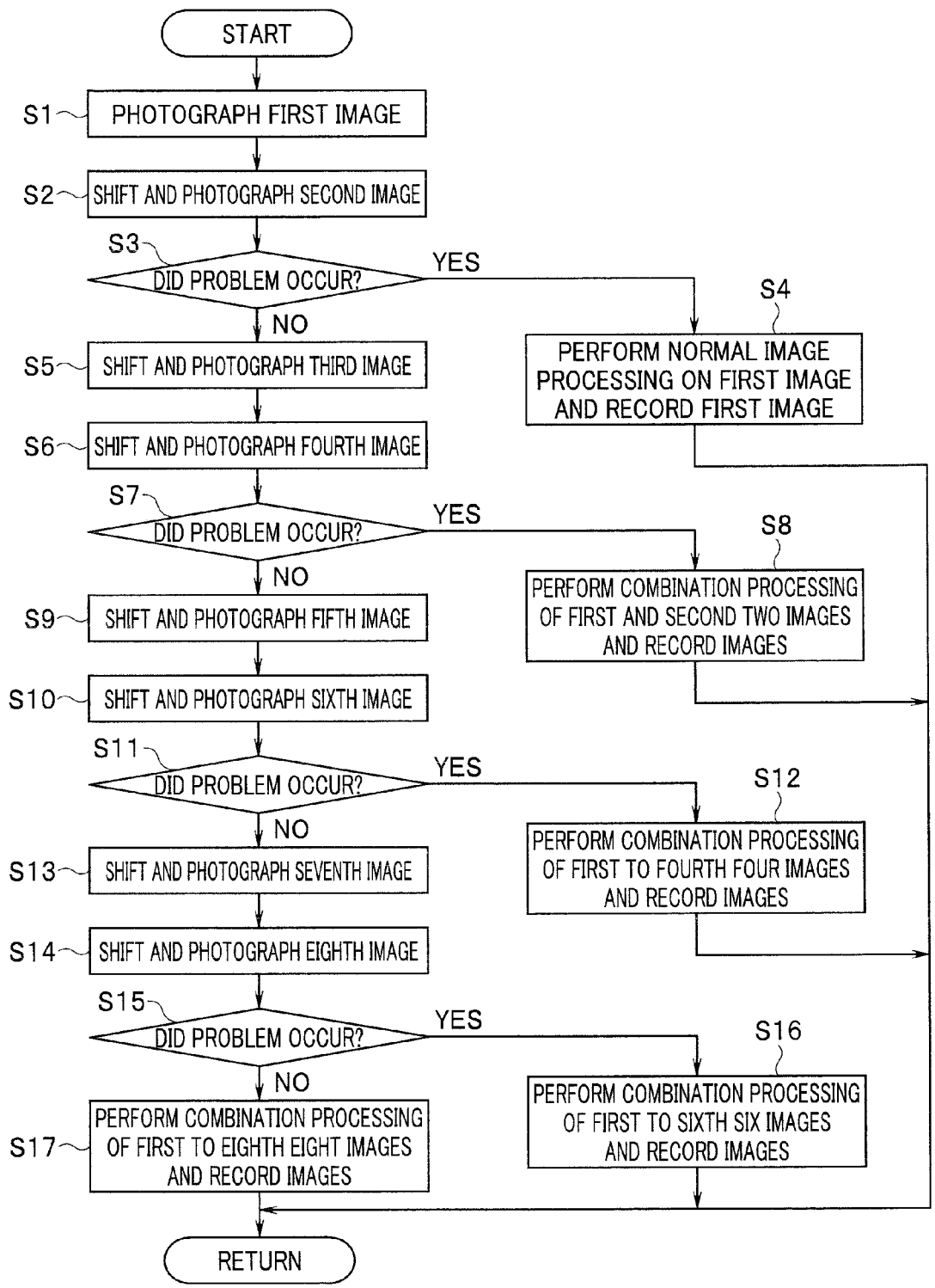
FIG. 25 is a flowchart for explaining an operation in a pixel shift super-resolution photographing mode in the first embodiment.

Processing in performing the pixel shifts in the order shown in FIG. 8 is explained according to a flowchart of FIG. 25 with reference to FIGS. 10 to 24. FIG. 25 is a flowchart for explaining an operation in the pixel shift super-resolution photographing mode. The processing shown in FIG. 25 is performed by the microcomputer 48 controlling the respective sections in the digital camera according to the processing program stored in the flash memory 47.

In not-shown main processing, when setting to the pixel shift super-resolution photographing mode is performed, the release button transitions to a state of the first release on, which is a depressed state at a first stage (a so-called half-pressed state), automatic exposure (AE) control by the AE processing section 32 and automatic focus control (AF) by the AF processing section 31 are performed, and the release button further transitions to a state of the second release on, which is a depressed state at a second stage, the processing shown in FIG. 25 is started.

Figure 10:
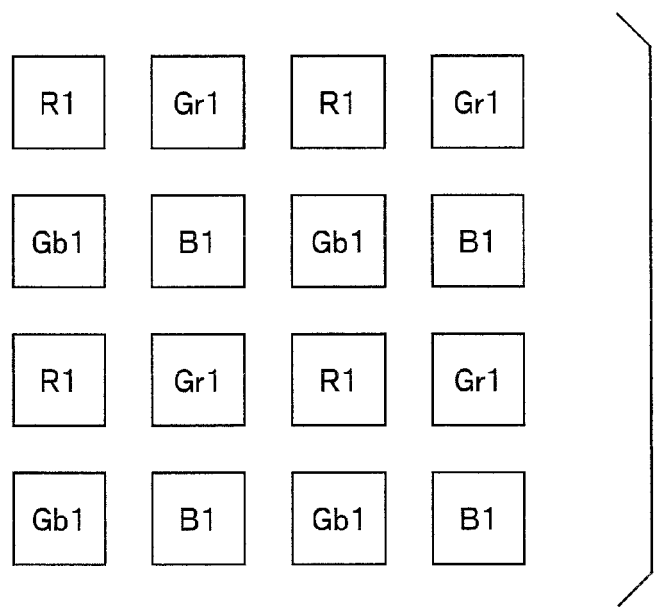
FIG. 10 is a diagram showing a pixel array obtained in a first pixel shift position in the first embodiment.

Then, first, the microcomputer 48 photographs a first image in an initial position and stores the first image in the SDRAM 29 (step S1). The photographed first image is an image of an RGB Bayer array shown in FIG. 10 same as the pixel array configured in the image pickup device 23. FIG. 10 is a diagram showing a pixel array obtained in a first pixel shift position. Note that, in FIGS. 10 to 24, numbers attached to color components of the respective pixels indicate photographing order of an image from which the pixels are obtained.

Figure 11:
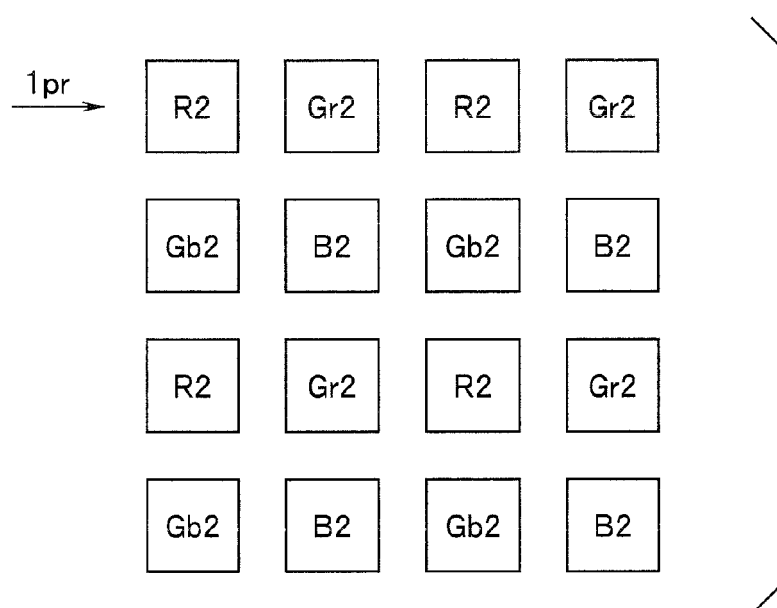
FIG. 11 is a diagram showing a pixel array obtained in a second pixel shift position in the first embodiment.

Subsequently, the microcomputer 48 drives the voice coil motor (VCM) 26, performs a pixel shift by one pixel pitch in a right direction as indicated by an arrow 1 pr in FIG. 11, then, photographs a second image, and stores the second image in the SDRAM 29 (step S2). FIG. 11 is a diagram showing a pixel array obtained in a second pixel shift position.

The second pixel shift position for acquiring the second image is a pixel shift position where G components in pixel positions lacking the G components can be acquired in the first image.

Figure 12:
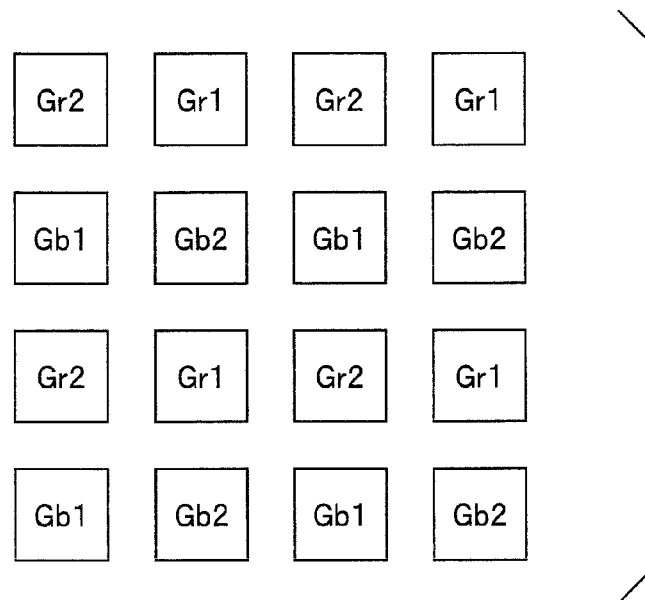
FIG. 12 is a diagram showing an array of G pixels obtained as a result of performing a second pixel shift in the first embodiment.

That is, when the pixel shifts shown in FIG. 11 are performed, an array of G pixels shown in FIG. 12 is obtained. FIG. 12 is a diagram showing an array of G pixels obtained as a result of performing a second pixel shift. In this way, Gr2 pixels are obtained in positions of R1 pixels in FIG. 10. Gb2 pixels are obtained in positions of B1 pixels in FIG. 10. Therefore, G components are obtained in all pixel positions with 1×1 resolution. It is seen that resolution of luminance equivalent components is improved.

Figure 13:
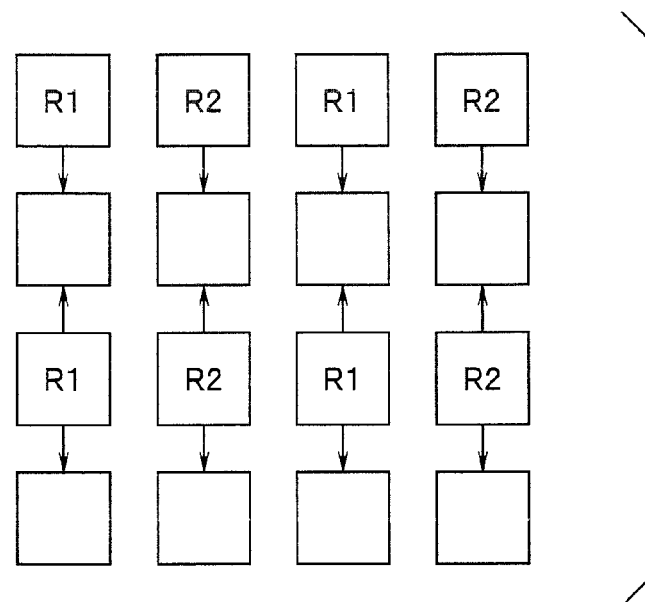
FIG. 13 is a diagram showing an array of R pixels obtained as a result of performing the second pixel shift and a state of complementation in the first embodiment.

When the pixel shifts shown in FIG. 11 are performed, an array of R pixels shown in FIG. 13 is obtained. FIG. 13 is a diagram showing an array of R pixels obtained as a result of performing a second pixel shift and a state of complementation. That is, since R2 pixels are obtained in positions of Gr1 pixels in FIG. 10, it is seen that resolution in a horizontal direction of R components is improved. Note that, concerning B components, a result substantially the same as the result of the R components is obtained.

After processing in step S2 is performed, as explained above, the microcomputer 48 determines, on the basis of a detection result of the Hall element 27, a detection result of the posture detecting section 33, and a detection result of the image comparing section 35, whether second image data is inappropriate for image composition (i.e., whether a problem occurs in the photographing of the second image) (step S3).

When determining that a problem occurs, the microcomputer 48 performs, with the image processing section 36, normal image processing including the demosaicking processing of the demosaicking processing section 37 on the first image and records image data after the processing in the recording medium 45 (step S4).

Figure 14:
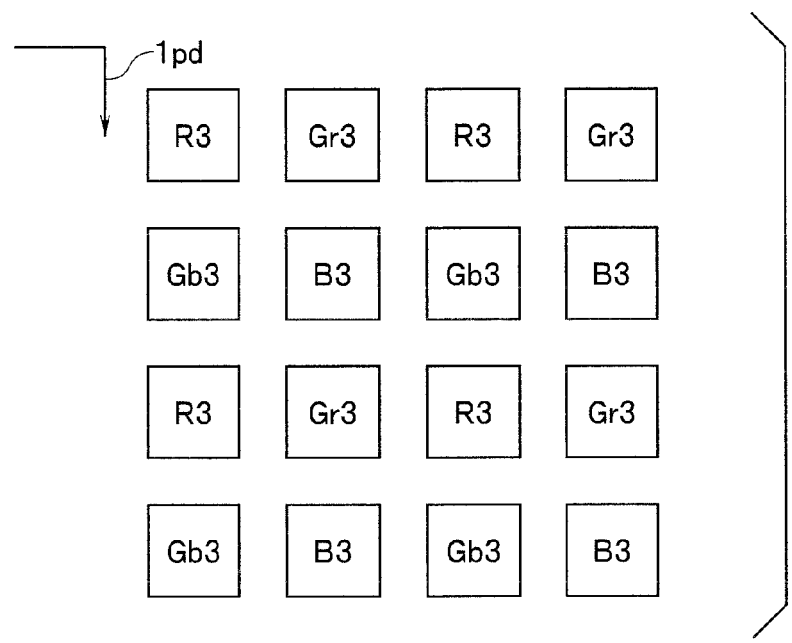
FIG. 14 is a diagram showing a pixel array obtained in a third pixel shift position in the first embodiment.

When determining that a problem does not occur, the microcomputer 48 drives the voice coil motor (VCM) 26, performs a pixel shift by one pixel pitch in a downward direction as indicated by an arrow 1 pd in FIG. 14, then, photographs a third image, and stores the third image in the SDRAM 29 (step S5). FIG. 14 is a diagram showing a pixel array obtained in a third pixel shift position.

Figure 15:
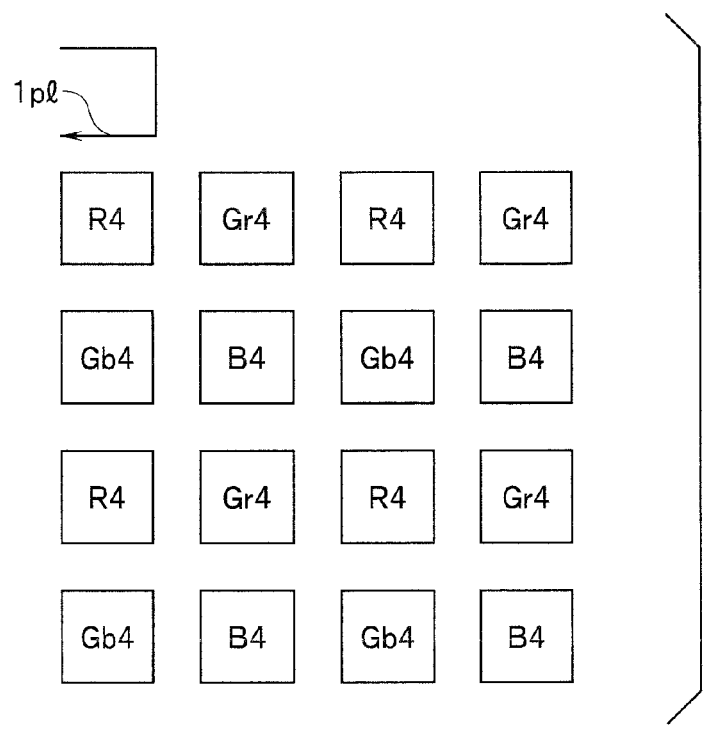
FIG. 15 is a diagram showing a pixel array obtained in a fourth pixel shift position in the first embodiment.

Subsequently, the microcomputer 48 drives the voice coil motor (VCM) 26, performs a pixel shift by one pixel pitch in a left direction as indicated by an arrow 1 pl in FIG. 15, then, photographs a fourth image, and stores the fourth image in the SDRAM 29 (step S6). FIG. 15 is a diagram showing a pixel array obtained in a fourth pixel shift position.

After causing the image pickup device 23 to acquire the second image, the microcomputer 48 causes the voice coil motor (VCM) 26 to perform pixel shifts and causes the image pickup device 23 to acquire the third image and the fourth image such that R components in pixel positions lacking the R components can be acquired and B components in pixel positions lacking the B components can be acquired.

Figure 16:
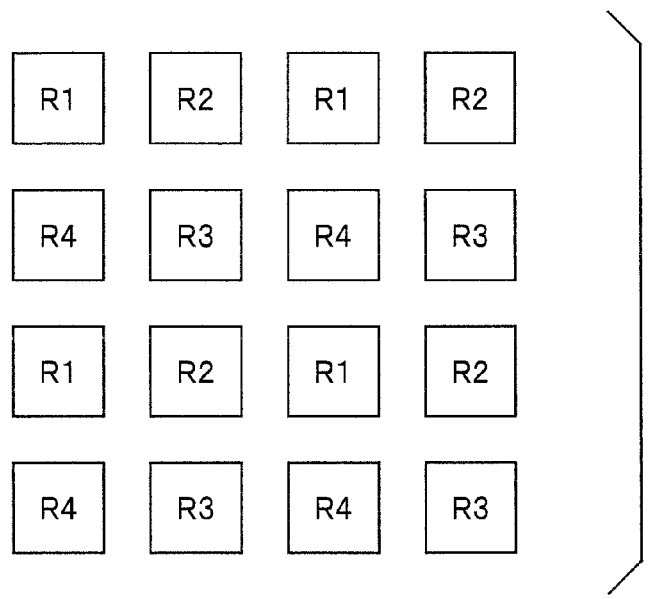
FIG. 16 is a diagram showing an array of R pixels obtained as a result of performing a fourth pixel shift in the first embodiment.

That is, when the pixel shifts up to the fourth pixel shift position are performed, an array of R pixels shown in FIG. 16 is obtained. FIG. 16 is a diagram showing an array of R pixels obtained as a result of performing a fourth pixel shift. In this way, R2 pixels are obtained in positions of Gr1 pixels in FIG. 10, R3 pixels are obtained in positions of B1 pixels in FIG. 10, and R4 pixels are obtained in positions of Gb1 pixels in FIG. 10. Therefore, R components are obtained in all pixel positions with 1×1 resolution. It is seen that color resolution is improved. Concerning B components, a result substantially the same as the result of the R components is obtained.

On the other hand, concerning G components, both of Gr pixels and Gb pixels are obtained in all pixel positions of an array with 1×1 resolution.

In the same manner as explained above, the microcomputer 48 determines whether a problem occurs in the photographing of at least one of the third image and the fourth image (step S7). Note that, for simplification, the microcomputer 48 collectively determines presence or absence of problem occurrence in the third and fourth images after performing processing in step S6. However, actually, it is desirable that, after performing processing in step S5, the microcomputer 48 determines presence or absence of problem occurrence in the third image and, when a problem occurs, proceeds to processing in step S8. The same applies to step S9 and step S13 explained below.

When determining that a problem occurs, after the two-image-combination processing section 34*a* performs combination processing of the first and second images and after performing general image processing such as the edge enhancement processing and noise reduction processing by the image processing section 36, the microcomputer 48 records image data after the processing in the recording medium 45 (step S8).

First, in the two-image-combination processing section 34*a*, the pixel arranging section 51 rearranges, for each of the color components, respective pixels of the first and second images to be arrayed in an array with 1×1 resolution. The pixel arranging section 51 performs the rearrangement for each of the color components regarding that the Gr pixels and the Gb pixels are the G pixels of the same color. Consequently, G pixels shown in FIG. 12, R pixels shown in FIG. 13, and B pixels substantially the same as B pixels shown in FIG. 13 are obtained.

Subsequently, the pixel complementing section 52 performs, concerning R components and B components in which lost pixels are present in the array with 1×1 resolution, complementation for setting averages of pixels values adjacent above and below the lost pixels as pixel values of the lost pixels, for example, as shown in FIG. 13.

In this way, a combined image outputted from the combination processing section 34 is a demosaicked image without lost pixels in the array with 1×1 resolution concerning all the color components of RGB. Therefore, the processing of the demosaicking processing section 37 in the image processing section 36 is skipped and the other processing is performed.

Figure 17:
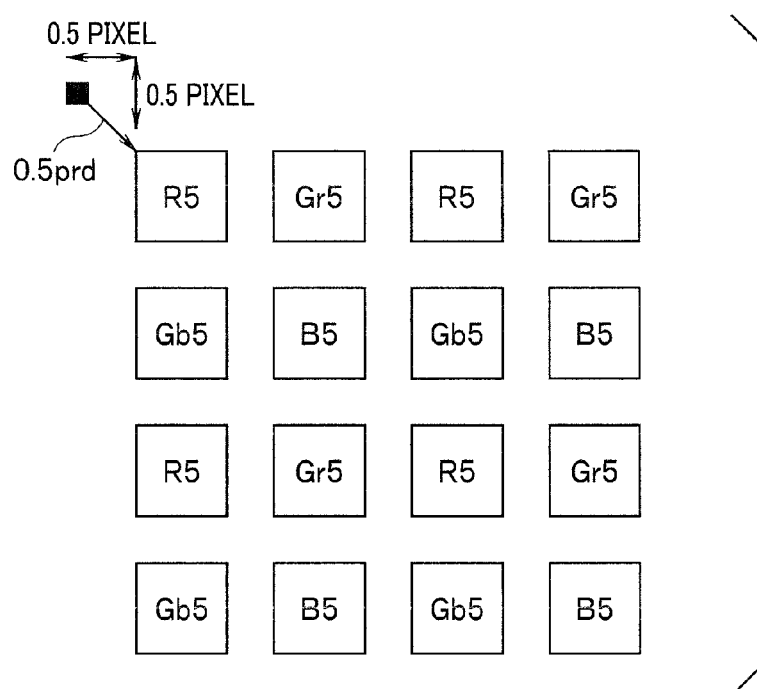
FIG. 17 is a diagram showing a pixel array obtained in a fifth pixel shift position in the first embodiment.

When determining in step S7 that a problem does not occur, the microcomputer 48 drives the voice coil motor (VCM) 26 and, after shifting the image by one pixel pitch upward and returning the image to a position of the first image (the initial position) indicated by a black square in FIG. 17, performs pixel shifts by 0.5 pixel pitch to the right and 0.5 pixel pitch downward (i.e., as explained above, 1/√2 pixel pitch in the right downward direction) as indicated by an arrow 0.5 prd in FIG. 17, then, photographs a fifth image, and stores the fifth image in the SDRAM 29 (step S9). FIG. 17 is a diagram showing a pixel array obtained in a fifth pixel shift position.

Figure 18:
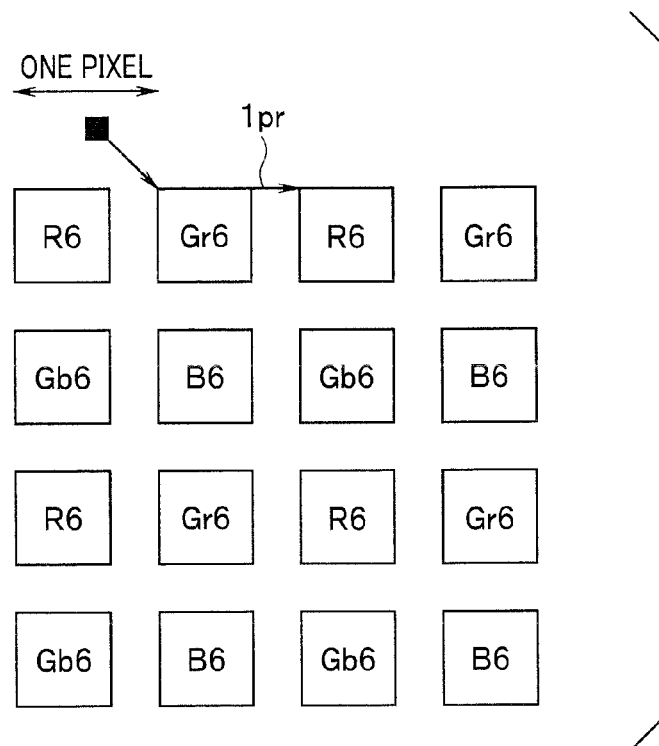
FIG. 18 is a diagram showing a pixel array obtained in a sixth pixel shift position in the first embodiment.

Subsequently, the microcomputer 48 drives the voice coil motor (VCM) 26, performs a pixel shift by one pixel pitch in the right direction as indicated by an arrow 1 pr in FIG. 18, then, photographs a sixth image, and stores the sixth image in the SDRAM 29 (step S10). FIG. 18 is a diagram showing a pixel array obtained in a sixth pixel shift position.

After causing the image pickup device 23 to acquire the fourth image, the microcomputer 48 causes the voice coil motor (VCM) 26 to perform pixel shifts to include a movement amount half-integer times as large as a pixel pitch in both of the vertical direction and the horizontal direction of a two-dimensional array and causes the image pickup device 23 to acquire the fifth image. Further, the microcomputer 48 causes the voice coil motor (VCM) 26 to perform pixel shifts such that G components in pixel positions lacking the G components can be acquired in the fifth image and causes the image pickup device 23 to acquire the sixth image.

Figure 19:
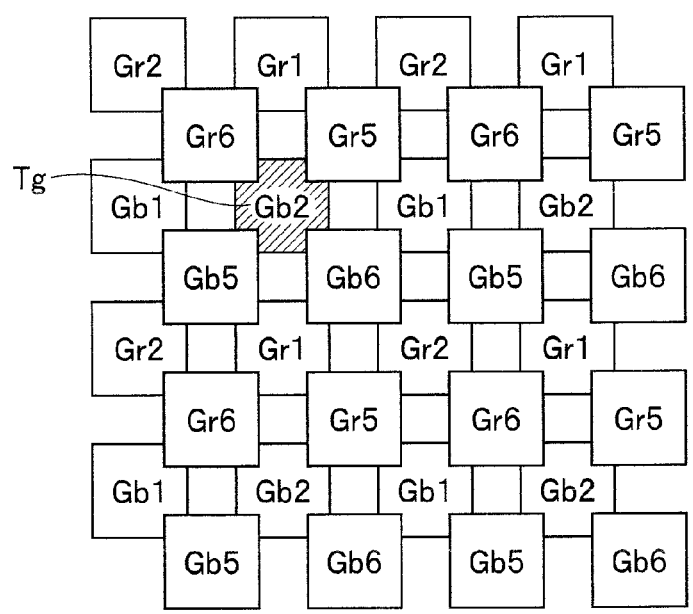
FIG. 19 is a diagram showing an array of G pixels obtained as a result of performing a sixth pixel shift in the first embodiment.

That is, when the pixel shifts up to the sixth pixel shift position are performed, for example, an array of G pixels shown in FIG. 19 is obtained. FIG. 19 is a diagram showing an array of G pixels obtained as a result of performing a sixth pixel shift.

In this way, a basic array of G pixels shown in FIG. 12 is obtained by the first and second images.

Further, although not shown in FIG. 19, a basic array of G pixels in which Gr3 pixels are arranged in positions of Gb1 pixels in FIG. 12, Gb3 pixels are arranged in positions of Gr1 pixels in FIG. 12, Gr4 pixels are arranged in positions of Gb2 pixels in FIG. 12, and Gb4 pixels are arranged in positions of Gr2 pixels in FIG. 12 is obtained by the third and fourth images.

In addition, a shifted array of G pixels in a positional relation obtained by shifting the basic array of the G pixels in FIG. 12 by 1/√2 pixel pitch in the right downward direction shown in FIG. 19 is obtained by the fifth and sixth images. More specifically, in the shifted array, Gr5 pixels are arranged in positions to which Gr1 pixels are shifted by 1/√2 pixel pitch in the right downward direction, Gr6 pixels are arranged in positions to which Gr2 pixels are shifted by 1√2 pixel pitch in the right downward direction, Gb5 pixels are arranged in positions to which Gb1 pixels are shifted by 1/√2 pixel pitch in the right downward direction, and Gb6 pixels are arranged in positions to which Gb2 pixels are shifted by 1/√2 pixel pitch in the right downward direction.

In the same manner as explained above, the microcomputer 48 determines whether a problem occurs in photographing of at least one of the fifth image and the sixth image (step S11).

When determining that a problem occurs, after the four-image-combination processing section 34b performs combination processing of the first to fourth images and after performing general image processing such as the edge enhancement processing and the noise reduction processing by the image processing section 36, the microcomputer 48 records image data after the processing in the recording medium 45 (step S12).

In the four-image-combination processing section 34b, first, the pixel arranging section 51 rearranges, for each of the color components, the respective pixels of the first to fourth images to be arrayed in a basic array with 1×1 resolution. The pixel arranging section 51 performs the rearrangement for each of the color components regarding that Gr pixels and Gb pixels have different colors. Consequently, R pixels shown in FIG. 16 and Gr pixels, Gb pixels, and B pixels substantially the same as Gr pixels, Gb pixels, and B pixels shown in FIG. 16 are obtained.

Subsequently, the adding section 53 and the dividing section 54 configuring the averaging section average the Gr pixels and the Gb pixels present in the same pixel positions in the basic array with 1×1 resolution and output the Gr pixels and the Gb pixels as G pixels. As a result, a combined image outputted from the combination processing section 34 is a demosaicked image. Therefore, as explained above, the processing of the demosaicking processing section 37 in the image processing section 36 is skipped and the other processing is performed.

Figure 22:
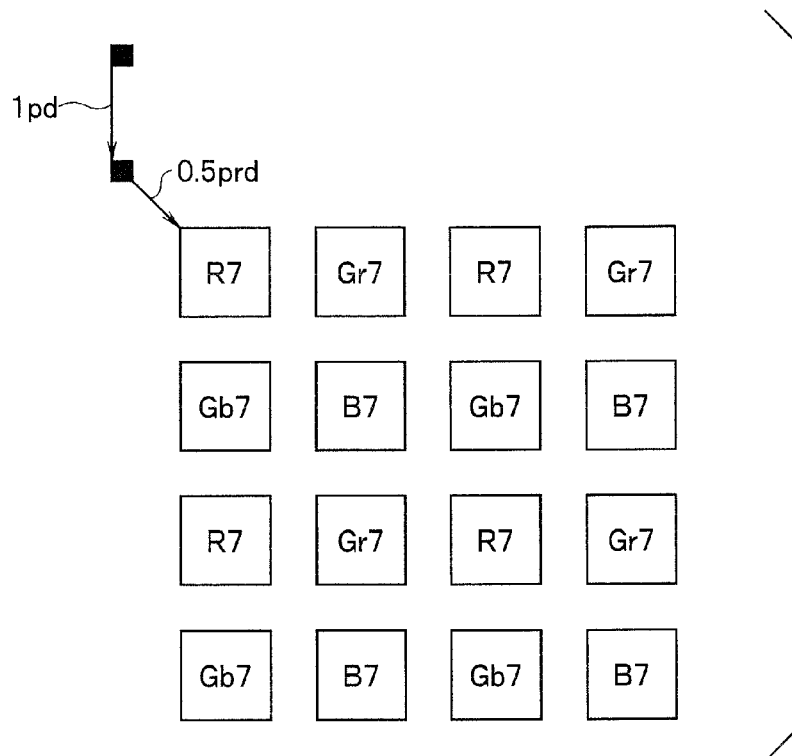
FIG. 22 is a diagram showing a pixel array obtained in a seventh pixel shift position in the first embodiment.

When determining in step S11 that a problem does not occur, the microcomputer 48 drives the voice coil motor (VCM) 26 and, for example, after returning the image to the position of the first image (the initial position) (however, actually, it is unnecessary to once return the image to the initial position), performs a pixel shift by one pixel pitch in the downward direction as indicated by an arrow 1 pd in FIG. 22, then, performs pixel shifts (a shift amount from the sixth image is one pixel pitch downward and one pixel pitch to the left) by 0.5 pixel pitch to the right and 0.5 pixel pitch downward (i.e., 1/√2 pixel pitch in the right downward direction (the same applies below)) as indicated by an arrow 0.5 prd, photographs a seventh image, and stores the seventh image in the SDRAM 29 (step S13). FIG. 22 is a diagram showing a pixel array obtained in a seventh pixel shift position.

Figure 23:
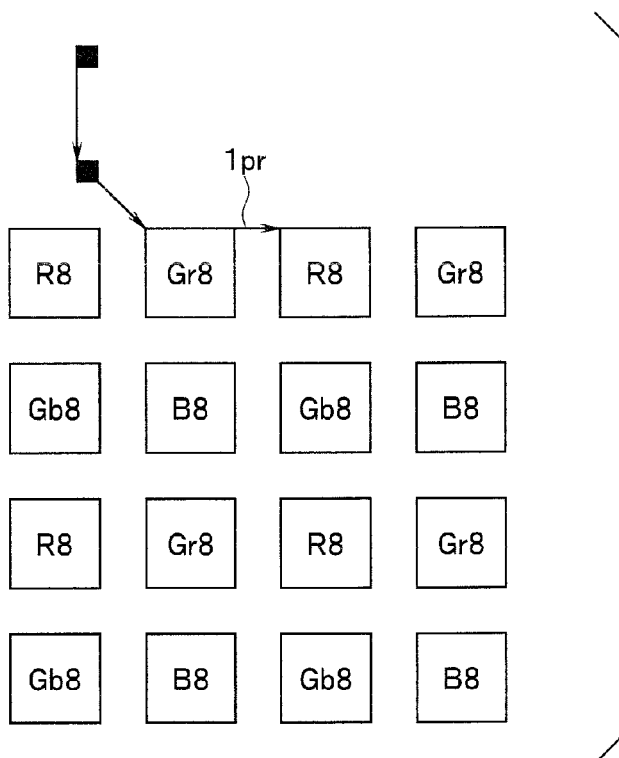
FIG. 23 is a diagram showing a pixel array obtained in an eighth pixel shift position in the first embodiment.

Subsequently, the microcomputer 48 drives the voice coil motor (VCM) 26, performs a pixel shift by one pixel pitch in the right direction as indicated by an arrow 1 pr in FIG. 23, then, photographs an eighth image, and stores the eighth image in the SDRAM 29 (step S14). FIG. 23 is a diagram showing a pixel array obtained in an eighth pixel shift position.

After causing the image pickup device 23 to acquire the sixth image, the microcomputer 48 causes the voice coil motor (VCM) 26 to perform pixel shifts such that R components in pixel positions lacking the R components can be acquired and B components in pixel positions lacking the B components can be acquired in both of the fifth image and the sixth image (in the shifted array) and causes the image pickup device 23 to acquire the seventh image and the eighth image.

That is, when the pixel shifts up to the eighth pixel shift position are performed, for example, an array of R pixels shown in FIG. 24 is obtained. FIG. 24 is a diagram showing an array of R pixels obtained as a result of performing an eighth pixel shift. In this way, a basic array of R pixels shown in FIG. 24 is obtained by the first to fourth images. Further, a shifted array of R pixels shown in FIG. 24 is obtained by the fifth to eighth images. Concerning B components, a result substantially the same as the result for the R component is obtained.

In the same manner as explained above, the microcomputer 48 determines whether a problem occurs in photographing of at least one of the seventh image and the eighth image (step S15).

When determining that a problem occurs, after the six-image-combination processing section 34c performs combination processing of the first to sixth images and after performing general image processing such as the edge enhancement processing and the noise reduction processing by the image processing section 36, the microcomputer 48 records image data after the processing in the recording medium 45 (step S16).

In the six-image-combination processing section 34c, first, the pixel arranging section 51 rearranges the Gr pixels and the Gb pixels of the first and second images to be arrayed in the basic array with 1×1 resolution. Further, the pixel arranging section 51 rearranges the R pixels of the first to fourth images to be arrayed in the basic array with 1×1 resolution and similarly rearranges the B pixels of the first to fourth images to be arrayed in the basic array with 1×1 resolution. In addition, the pixel arranging section 51 rearranges the Gr pixels and the Gb pixels of the fifth to sixth images to be shifted by 1/√2 pixel pitch in the right downward direction from the rearranged Gr pixels and Gb pixels of the first and second images to be arrayed in a shifted array with 1×1 resolution (see Gr5, Gr6, Gb5, and Gb6 in FIG. 19).

Concerning the Gr pixels or the Gb pixels, the oblique-pixel-shift complementing section 55 calculates G pixels by weighting and averaging a certain pixel in the basic array and four pixels in the shifted array adjacent to the pixel in respective intermediate positions of the pixels (positions where the pixel in the basic array and the pixels in the shifted array overlap in diagonal directions in FIG. 19) and generates G pixels of an array with 2×2 resolution.

Figure 20:
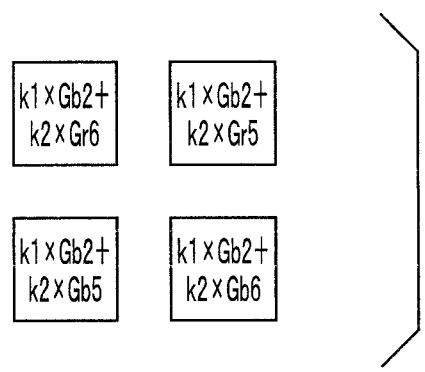
FIG. 20 is a diagram showing an example in which complementation is performed from the G pixels obtained as a result of performing the sixth pixel shift in the first embodiment.

FIG. 20 is a diagram showing an example in which complementation is performed from the G pixels obtained as a result of performing the sixth pixel shift.

More specifically, G pixels of the array with 2×2 resolution having pixel values of (k1×Gb2+k2×Gr6), (k1×Gb2+k2×Gr5), (k1×Gb2+k2×Gb5), and (k1×Gb2+k2×Gb6) are complemented in positions of corners overlapping, in FIG. 19, a hatched pixel Tg in FIG. 19 (in an example shown in the figure, the Gb2 pixel in the basic array) and a Gr6 pixel adjacent at the upper left, a Gr5 pixel adjacent at the upper right, a Gb5 pixel adjacent at the lower left, and a Gb6 pixel adjacent at the lower right of the Gb2 pixel in the shifted array. In the pixel values, k1 and k2 are weight coefficients. For example, if k1=k2=1/2, an average is set as a complementation value.

Figure 21:
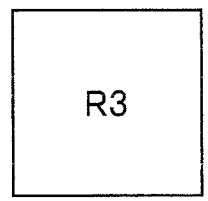
FIG. 21 is a diagram showing R pixels corresponding to the G pixels complemented from the G pixels obtained as a result of performing the sixth pixel shift in the first embodiment.

Concerning the R pixels and the B pixels, the division complementing section 56 performs division complementation. FIG. 21 is a diagram showing an R pixel corresponding to the G pixel complemented from the G pixels obtained as a result of performing the sixth pixel shift.

In a pixel position of the hatched pixel Tg in FIG. 19, as it is seen if FIG. 16 is referred to, an R3 pixel is obtained. Therefore, a pixel value of the R pixel shown in FIG. 21 is applied to all of the four G pixels complemented as shown in FIG. 20. Although not shown in the figure, the same processing is performed on the B pixels.

When determining in step S15 that a problem does not occur, after the eight-image-combination processing section 34d performs combination processing of the first to eighth images and after performing general image processing such as the edge enhancement processing or the noise reduction processing by the image processing section 36, the microcomputer 48 records image data after the processing in the recording medium 45 (step S17).

In the eight-image-combination processing section 34d, first, the pixel arranging section 51 rearranges, for each of the color components, the respective pixels of the first to eighth images to be arrayed in, for example, an array shown in FIG. 24. The pixel arranging section 51 performs the rearrangement for each of the color components regarding that Gr pixels and Gb pixels have different colors. Consequently, R pixels shown in FIG. 24 and Gr pixels, Gb pixels, and B pixels substantially the same as Gr pixels, Gb pixels, and B pixels shown in FIG. 24 are obtained.

The oblique-pixel-shift complementing section 55 performs, for each of the color components, the oblique pixel shift complementation explained above and respectively generates a Gr image, a Gb image, an R image, and a B image of the array with 2×2 resolution.

Subsequently, the adding section 53 and the dividing section 54 configuring the averaging section average the Gr pixels and the Gb pixels present in the same pixel positions in the array with 2×2 resolution and output the Gr pixels and the Gb pixels as G pixels. As a result, a combined image outputted from the combination processing section 34 is a demosaicked image. Therefore, as explained above, the processing of the demosaicking processing section 37 in the image processing section 36 is skipped and the other processing is performed.

In this way, after performing processing in step S4, step S8, step S12, step S16, or step S17, the microcomputer 48 returns from the processing to the not-shown main processing.

Therefore, when the detecting section detects occurrence of a defective image, the microcomputer 48 stops image acquisition thereafter and causes the combination processing section 34 to perform the processing for composing a high-quality image using images acquired before the defective image.

According to the first embodiment, the pixel shifts are performed in the pixel shift order in which a high-quality image can be composed even when image processing is performed on the basis of two or more images less than the predetermined number. Therefore, if two or more images are acquired, it is possible to obtain an image higher in image quality than one image acquired from the image pickup device 23 without performing re-photographing.

The pixel shift is performed to acquire the second image such that the G components in the pixel positions lacking the G components can be acquired in the first image. Therefore, at a stage where the second image is acquired, it is possible to obtain luminance equivalent components without performing pixel complementation and achieve improvement of image quality.

Further, the pixel shifts are performed to acquire the third image and the fourth image such that the R components in the pixel positions lacking the R components can be acquired in the first and second images and the B components in the pixel positions lacking the B components can be acquired in the first and second images. Therefore, at a stage where the fourth image is acquired, it is possible to obtain an image with 1×1 resolution without pixel complementation.

After the fourth image is acquired, the fifth image of the shifted array is acquired and the pixel shift is performed to acquire the sixth image such that the G components in the pixel positions lacking the G components can be acquired in the fifth image. Therefore, at a stage where the sixth image is acquired, it is possible to obtain luminance resolution of 2×2 resolution.

In addition, the pixel shifts are performed to acquire the seventh image and the eighth image such that the R components in the pixel positions lacking the R components in both of the fifth image and the sixth image and the B components in the pixel positions lacking the B components can be acquired in both of the fifth image and the sixth image. Therefore, at a stage where the eighth image is acquired, it is possible to obtain a super-resolution image with 2×2 resolution.

When detecting that a defective image occurs, as the control different from the control performed when occurrence of a defective image is not detected, the microcomputer 48 stops image acquisition thereafter and causes the combination processing section 34 to perform the processing for composing a high-quality image using images acquired before the defective image. Therefore, it is possible to reduce time until a high-quality image is obtained.

Further, since the plurality of kinds of the combination processing section 34 are provided, according to which image a defective image detected first is, the microcomputer 48 can appropriately select a type of the combination processing section 34 and cause the combination processing section 34 to perform processing.

When the Hall element 27 is used as the detecting section, it is possible to detect a deficiency of a pixel shift position. When the posture detecting section 33 is used as the detecting section, it is possible to detect, for example, a blur of the digital camera. When the image comparing section 35 is used as the detecting section, it is possible to detect a change in environmental light and an object blur.

Second Embodiment

Figure 26:
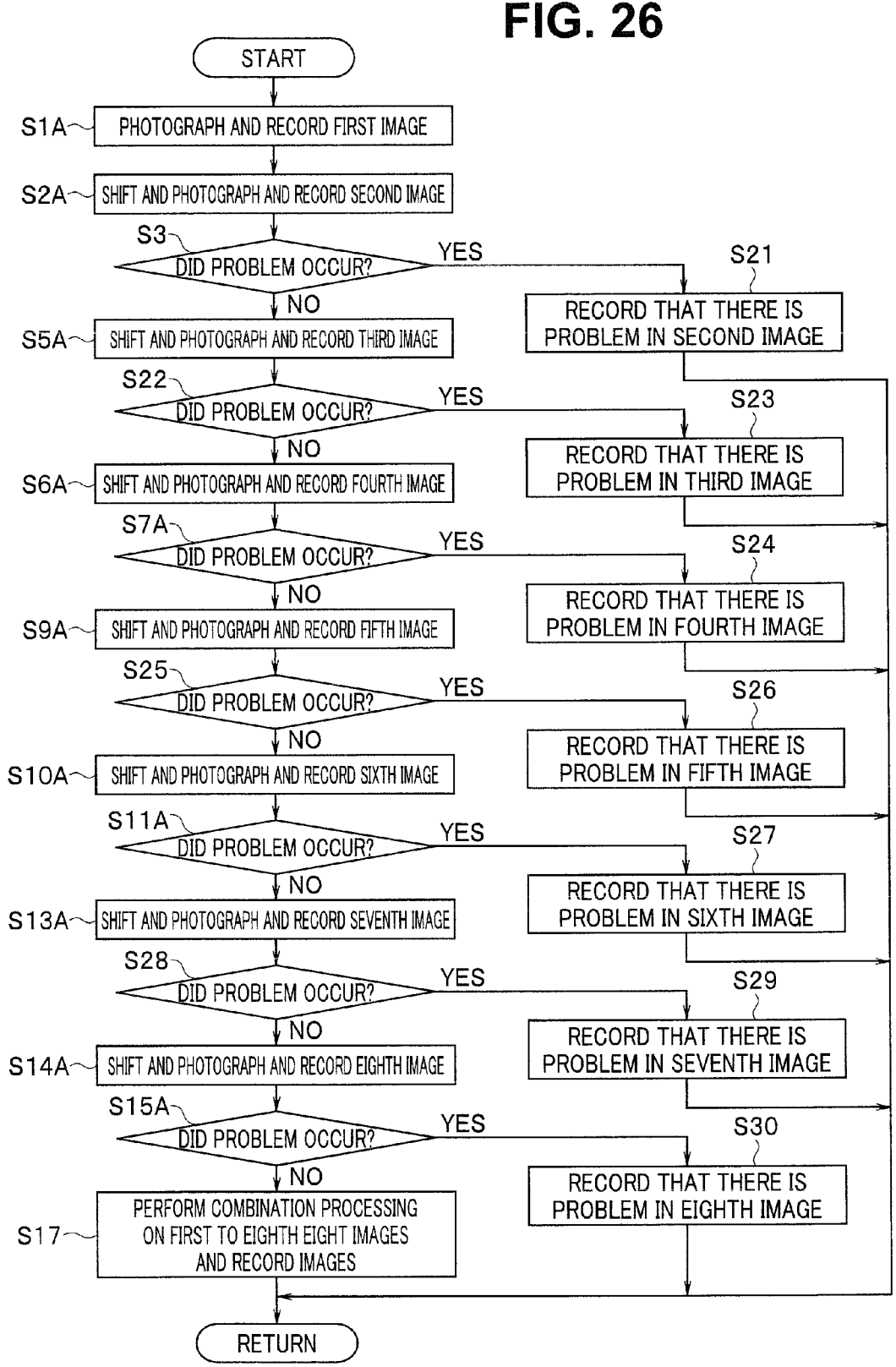
FIG. 26 is a flowchart for explaining an operation in a pixel shift super-resolution photographing mode in a second embodiment of the present invention.

FIG. 26 is a flowchart for explaining an operation in a pixel shift super-resolution photographing mode in a second embodiment of the present invention.

In the second embodiment, portions same as the portions in the first embodiment are, for example, denoted by the same reference numerals and signs and explanation of the portions is omitted as appropriate. Only differences are mainly explained.

In the above described first embodiment, when a problem occurs while the eight images necessary for composing a super-resolution image are acquired, a high-quality image is generated on the basis of images before the occurrence of the problem and recorded in the recording medium 45. On the other hand, in the present embodiment, an image acquired for composing a super-resolution image is recorded in the recording medium 45 every time the image is acquired. When a problem occurs while the image is acquired, it is recorded in the recording medium 45 in which image the problem occurs. Therefore, processing for generating a high-quality image on the basis of images acquired before the occurrence of the problem may be performed later in the digital camera. However, the processing may be performed by an external computer or the like.

When processing shown in FIG. 26 is started in not-shown main processing, first, the microcomputer 48 photographs a first image in an initial position, stores the first image in the SDRAM 29, and records the first image in the recording medium 45 (step S1A).

Subsequently, the microcomputer 48 performs a pixel shift to a pixel position of a second image, photographs the second image, stores the second image in the SDRAM 29, and records the second image in the recording medium 45 (step S2A).

The microcomputer 48 performs the processing in step S3 and determines whether a problem occurs in the photographing of the second image.

When determining that a problem occurs, the microcomputer 48 records presence of the problem in the second image in the recording medium 45 (step S21).

When determining in step S3 that a problem does not occur, the microcomputer 48 performs a pixel shift to a pixel position of a third image, photographs the third image, stores the third image in the SDRAM 29, and records the third image in the recording medium 45 (step S5A).

Subsequently, the microcomputer 48 determines whether a problem occurs in the photographing of the third image (step S22).

When determining that a problem occurs, the microcomputer 48 records presence of the problem in the third image in the recording medium 45 (step S23).

When determining in step S22 that a problem does not occur, the microcomputer 48 performs a pixel shift to a pixel position of a fourth image, photographs the fourth image, stores the fourth image in the SDRAM 29, and records the fourth image in the recording medium 45 (step S6A).

The microcomputer 48 determines whether a problem occurs in the photographing of the fourth image (step S7A).

When determining that a problem occurs, the microcomputer 48 records presence of the problem in the fourth image in the recording medium 45 (step S24).

When determining in step S7A that a problem does not occur, the microcomputer 48 performs a pixel shift to a pixel position of a fifth image, photographs the fifth image, stores the fifth image in the SDRAM 29, and records the fifth image in the recording medium 45 (step S9A).

The microcomputer 48 determines whether a problem occurs in the photographing of the fifth image (step S25).

When determining that a problem occurs, the microcomputer 48 records presence of the problem in the fifth image in the recording medium 45 (step S26).

When determining in step S25 that a problem does not occur, the microcomputer 48 performs a pixel shift to a pixel position of a sixth image, photographs the sixth image, stores the sixth image in the SDRAM 29, and records the sixth image in the recording medium 45 (step S10A).

The microcomputer 48 determines whether a problem occurs in the photographing of the sixth image (step S11A).

When determining that a problem occurs, the microcomputer 48 records presence of the problem in the sixth image in the recording medium 45 (step S27).

When determining in step S11A that a problem does not occur, the microcomputer 48 performs a pixel shift to a pixel position of a seventh image, photographs the seventh image, stores the seventh image in the SDRAM 29, and records the seventh image in the recording medium 45 (step S13A).

The microcomputer 48 determines whether a problem occurs in the photographing of the seventh image (step S28).

When determining that a problem occurs, the microcomputer 48 records presence of the problem in the seventh image in the recording medium 45 (step S29).

When determining in step S28 that a problem does not occur, the microcomputer 48 performs a pixel shift to a pixel position of an eighth image, photographs the eighth image, stores the eighth image in the SDRAM 29, and records the eighth image in the recording medium 45 (step S14A).

The microcomputer 48 determines whether a problem occurs in the photographing of the eighth image (step S15A).

When determining that a problem occurs, the microcomputer 48 records presence of the problem in the eighth image in the recording medium 45 (step S30).

When determining in step S15A that a problem does not occur, the microcomputer 48 performs processing in step S17, generates a combined image, performs image processing, and records the combined image in the recording medium 45.

After performing processing in step S21, step S23, step S24, step S26, step S27, step S29, step S30, or step S17, the microcomputer 48 returns from the processing to the not-shown main processing.

In this way, when the detecting section detects occurrence of a defective image, the microcomputer 48 causes the memory I/F 44, which is the recording control section, to perform control for recording, together with an acquired image, which image among a predetermined number of images is detected as the defective image first.

According to the second embodiment, effects substantially the same as the effects of the first embodiment are achieved. Further, when occurrence of a defective image is detected, as the control different from the control performed when occurrence of a defective image is not detected, the microcomputer 48 records, together with an acquired image, which image among a predetermined number of images is detected as the defective image first. Therefore, in the digital camera or other devices such as a personal computer, it is possible to generate a high-quality image at a desired point in time in a later stage.

Therefore, when a problem occurs while a super-resolution image is photographed, the user can select as desired whether to generate as high quality an image as possible from images already acquired putting importance on a photo opportunity or perform photographing again. Consequently, when the photographing is performed again, that is, when it is unnecessary to generate a high-quality image from a series of images in which a problem occurs during photographing thereof, it is possible to omit the image combination processing and reduce a processing load.

Third Embodiment

FIGS. 27 to 34 show a third embodiment of the present invention. In the third embodiment, portions same as the portions in the first and second embodiments are, for example, denoted by the same reference numerals and signs and explanation of the portions is omitted as appropriate. Only differences are mainly explained.

In the first embodiment, the pixel shifts are performed in the order described below.

(1) After a first image is photographed, in a basic array, the pixel shifts are performed to fill Bayer lost positions of G pixels, which are luminance equivalent portions, and a second image is photographed.

(2) The pixel shifts are performed to fill lost positions of R pixels and B pixels in the basic array and third and fourth images are photographed.
(3) In a shifted array, the pixel shifts are performed to fill the G pixels, which are the luminance equivalent components, and fifth and sixth images are photographed.
(4) The pixel shifts are performed to fill lost positions of the R pixels and the B pixels in the shifted array and seventh and eighth images are photographed.

That is, in the first embodiment, the pixels of the shifted array are acquired in the fifth and subsequent images. This is for the purpose of obtaining a high-quality image by reducing pixels that need to be complemented, although having the same resolution.

On the other hand, in the present embodiment, the pixel shifts are performed in order of (1), (3), (2), and (4). That is, in the present embodiment, as explained below, an increase in resolution of luminance components is achieved at a stage when the fourth image is acquired.

Figure 29:
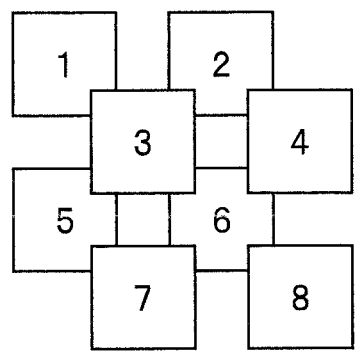
FIG. 29 is a diagram showing a first example of pixel shift order in the third embodiment.

More specifically, FIG. 29 is a diagram showing a first example of the pixel shift order in the present embodiment.

In the first example, after a first image is acquired in an initial position, the first image is shifted by one pixel pitch to the right to acquire a second image, the second image is shifted by 0.5 pixel pitch to the left and 0.5 pixel pitch downward (i.e., 1/√2 pixel pitch to the lower left (the same applies as appropriate below)) to acquire a third image, the third image is shifted by one pixel pitch to the right to acquire a fourth image, the fourth image is shifted by 1.5 pixel pitch to the left and 0.5 pixel pitch downward to acquire a fifth image, the fifth image is shifted by one pixel pitch to the right to acquire a sixth image, the sixth image is shifted by 0.5 pixel pitch to the left and 0.5 pixel pitch to downward to acquire a seventh image, and the seventh image is shifted by one pixel pitch to the right to acquire an eighth image.

Figure 30:
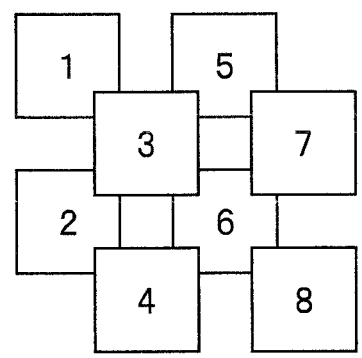
FIG. 30 is a diagram showing a second example of the pixel shift order in the third embodiment.

FIG. 30 is a diagram showing a second example of the pixel shift order in the present embodiment.

In the second example, after a first image is acquired in an initial position, the first image is shifted by one pixel pitch downward to acquire a second image, the second image is shifted by 0.5 pixel pitch to the right and 0.5 pixel pitch upward to acquire a third image, the third image is shifted by one pixel pitch downward to acquire a fourth image, the fourth image is shifted by 0.5 pixel pitch to the right and 1.5 pixel pitch upward to acquire a fifth image, the fifth image is shifted by one pixel pitch downward to acquire a sixth image, the sixth image is shifted by 0.5 pixel pitch to the right and 0.5 pixel pitch upward to acquire a seventh image, and the seventh image is shifted by one pixel pitch downward to acquire an eighth image.

As in the first and second embodiments, after the eighth image is acquired, processing for returning the eighth image to the initial position to prepare for the next photographing is performed.

Note that, in the present embodiment, as in the first and second embodiments, an image to be recorded in the recording medium 45 is generated at a point in time when any one of the first, second, fourth, sixth, and eighth images is obtained. Therefore, in both of the examples shown in FIGS. 29 and 30, the acquisition order of the third and fourth images may be reversed, the acquisition order of the fifth and sixth images may be reversed, and the acquisition order of the seventh and eighth images may be reversed.

Therefore, as it is seen when the pixel shift order shown in FIGS. 29 and 30 and the pixel shift order shown in FIGS. 8 and 9 are compared, pixel shift positions attained at respective stages when the first, second, sixth, and eighth images are obtained among stages when the first, second, fourth, sixth, and eighth images to be combined are obtained are the same. A difference occurs only at stages when the first to fourth images are obtained.

In this way, complementation processing in the present embodiment is different from the complementation processing shown in FIG. 7 is only when fourth image combination processing is performed as shown in FIG. 27. FIG. 27 is a diagram showing types of complementation performed by respective combination processing sections 34*a*, 34*b'*, 34*c*, and 34*d* and the demosaicking processing section 37 and obtained resolution. That is, in the fourth image combination processing, oblique pixel shift complementation is performed for G pixels and pixel complementation and division complementation are performed for R pixels and B pixels.

Figure 28:
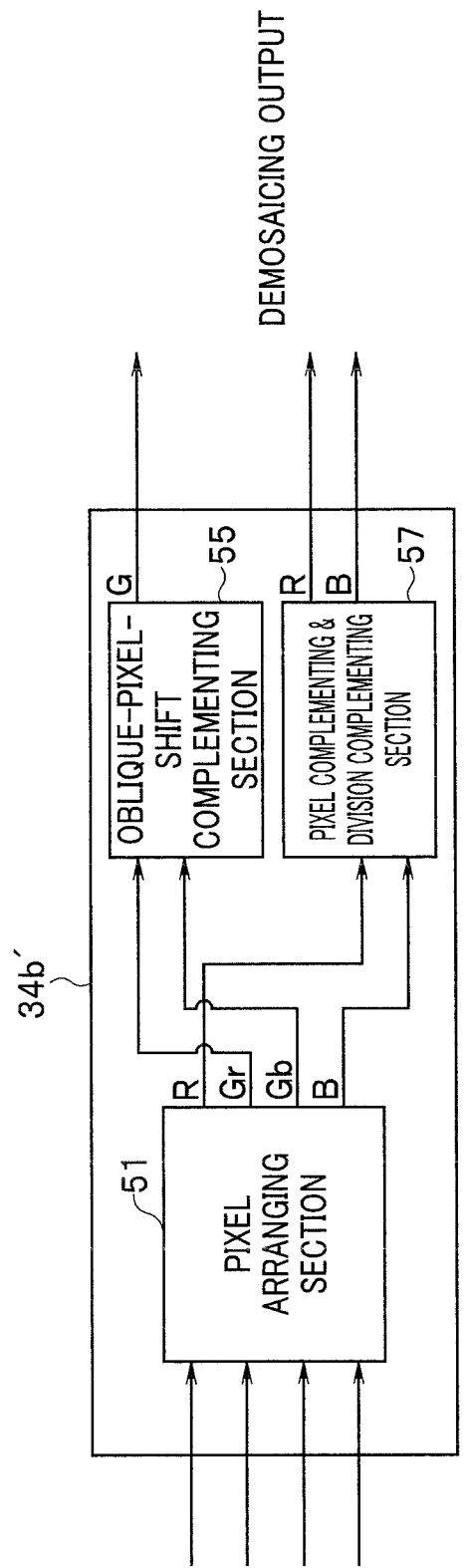
FIG. 28 is a block diagram showing a configuration of a four-image-combination processing section in the third embodiment.

FIG. 28 is a block diagram showing a configuration of a four-image-combination processing section 34*b'*.

The four-image-combination processing section 34*b'* in the present embodiment includes the pixel arranging section 51 that arranges respective pixels of inputted four image data according to pixel shift positions, the oblique-pixel-shift complementing section 55 that performs oblique pixel shift complementation on Gr pixels and Gb pixels, which fill a basic array and a shifted array, in the image data arranged by the pixel arranging section 51 and outputs the Gr pixels and the Gb pixels as a G image with 2×2 resolution, and a pixel complementing & division complementing section 57 that performs pixel complementation and division complementation on R pixels and B pixels, in which lost pixels occur in both of the basic array and the shifted array, in the image data arranged by the pixel arranging section 51 and outputs the R pixels and the B pixels as an R image and a B image having the number of pixels with 2×2 resolution.

Figure 31:
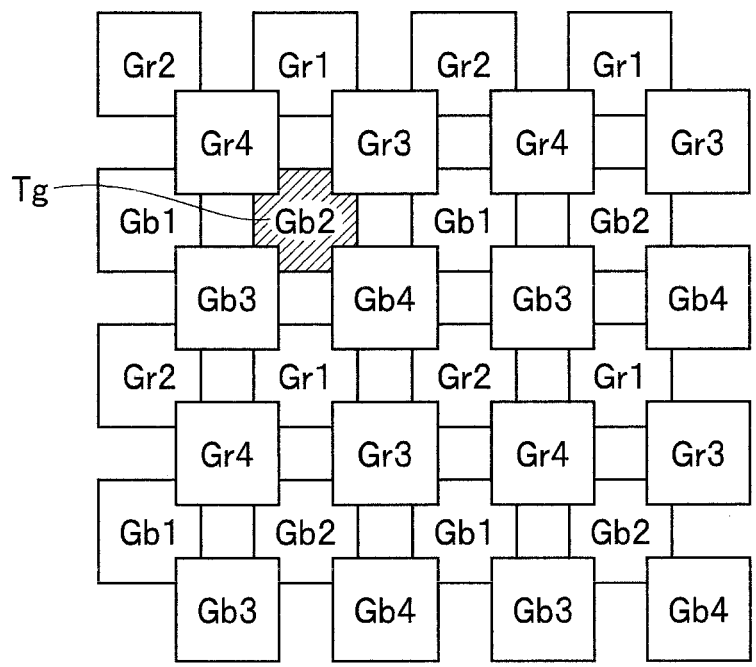
FIG. 31 is a diagram showing an array of Gr pixels and Gb pixels obtained as a result of performing a fourth pixel shift in the third embodiment.

FIG. 31 is a diagram showing an array of Gr pixels and Gb pixels obtained as a result of performing a fourth pixel shift. Note that, in FIG. 31, an example is shown in which the pixel shifts are performed in the order shown in FIG. 29.

In the present embodiment, pixel shift order for prioritizing improvement of luminance resolution is adopted. Therefore, after causing the image pickup device 23 to acquire a second image, the microcomputer 48 causes the voice coil motor (VCM) 26 to perform a pixel shift to include a movement amount half-integer times as large as a pixel pitch in both of a vertical direction and a horizontal direction of a two-dimensional array and acquire a third image. Further, the microcomputer 48 causes the voice coil motor (VCM) 26 to perform the pixel shift such that G components in pixel positions lacking the G components can be acquired in the third image and acquire a fourth image.

In this way, concerning the Gr pixels and the Gb pixels, which are luminance equivalent components, respective pixels values of the basic array and the shifted array necessary for an increase in resolution are acquired at a stage when the fourth pixel shift is performed (on the other hand, in the first embodiment explained above, the pixel values of the luminance equivalent components necessary for an increase in resolution are acquired at the stage after the sixth pixel shift is performed).

Figure 32:
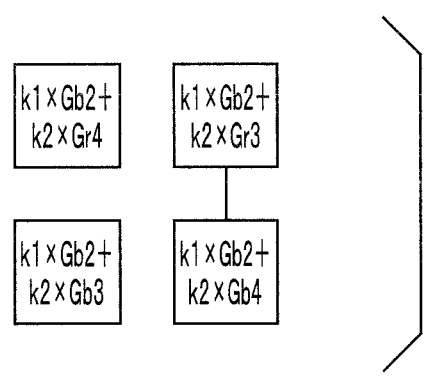
FIG. 32 is a diagram showing an example in which complementation is performed from G pixels obtained as a result of performing the fourth pixel shift in the third embodiment.

The oblique-pixel-shift complementing section 55 generates complementation pixels shown in FIG. 32 for a hatched pixel Tg in FIG. 31 (in an example shown in the figure, the Gb2 pixel in the basic array) and a Gr4 pixel adjacent at the upper left, a Gr3 pixel adjacent at the upper right, a Gb3 pixel adjacent at the lower left, and a Gb4 pixel adjacent at the lower right of the Gb2 pixel in the shifted array.

FIG. 32 is a diagram showing an example in which complementation is performed from G pixels obtained as a result of performing the fourth pixel shift.

As shown in FIG. 32, the oblique-pixel-shift complementing section 55 complements G pixels of an array with 2×2 resolution having pixel values of (k1×Gb2+k2×Gr4), (k1×Gb2+k2×Gr3), (k1×Gb2+k2×Gb3), and (k1×Gb2+k2×Gb4) in positions of corners overlapping other pixels adjacent to the hatched pixel Tg. In the pixel values, k1 and k2 are weight coefficients as explained above.

Figure 33:
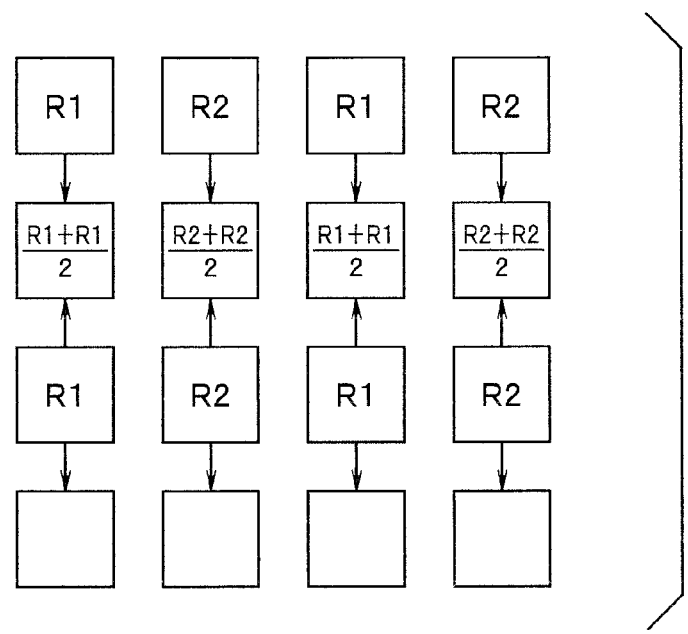
FIG. 33 is a diagram showing a state in which R pixels corresponding to the G pixels complemented from the G pixels obtained as a result of performing the fourth pixel shift is calculated in the third embodiment.

Concerning the R pixels and the B pixels, the pixel complementing & division complementing section 57 performs pixel complementation and division complementation. FIG. 33 is a diagram showing a state in which R pixels corresponding to G pixels complemented from the G pixels obtained as a result of performing the fourth pixel shift are calculated.

In FIG. 31, an R component is not obtained in a pixel position of the hatched pixel Tg. Therefore, first, in lost positions of R pixels in the basic array obtained up to the second pixel shift, as shown in FIG. 33, the pixel complementing & division complementing section 57 calculates all R components of the basic array by performing pixel complementation for calculating, for example, an average of R pixels adjacent above and below the lost positions. Note that the same processing can be performed in the shifted array. However, an example is explained in which it is sufficient to perform processing only concerning the basic array.

The R component of the basic array calculated in this way still has the number of pixels with 1×1 resolution. Therefore, a pixel value of one R pixel present in the pixel position of the hatched pixel Tg in FIG. 31 among the R pixels shown in FIG. 33 is applied to all of complemented four G pixels as shown in FIG. 32.

Although not shown in the figure, the pixel complementing & division complementing section 57 performs the same processing concerning the B pixels. Therefore, in an image outputted from the four-image-combination processing section 34b', luminance resolution is 2×2 resolution. However, color resolution is still 1×1 resolution (however, the number of pixels is the same as 2×2 resolution).

Thereafter, after causing the image pickup device 23 to acquire the fourth image, the microcomputer 48 causes the voice coil motor (VCM) 26 to perform the pixel shifts to acquire fifth to eighth images such that R components in pixels positions lacking the R components can be acquired and B components in pixel positions lacking the B components can be acquired in all of the first to fourth images.

Figure 34:
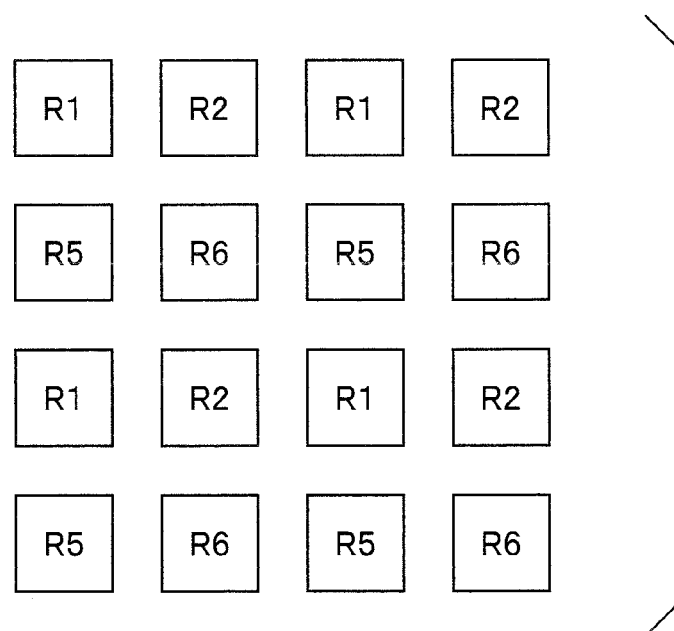
FIG. 34 is a diagram showing an array of R pixels obtained as a result of performing a sixth pixel shift in the third embodiment.

For example, in the present embodiment, concerning the color components (the R components and the B components), the pixel complementation in the basic array is unnecessary at a stage when the sixth pixel shift is performed as shown in FIG. 34 (on the other hand, in the first embodiment, the pixel complementation in the basic array is unnecessary at the stage when the fourth pixel shift is performed). FIG. 34 is a diagram showing an array of R pixels obtained as a result of performing the sixth pixel shift. As in the first embodiment explained above, concerning the color components (the R components and the B components), the pixel complementation in the shifted array is unnecessary at the stage when the eighth pixel shift is performed.

According to the third embodiment, effects substantially the same as the effects of the first and second embodiments are achieved. Further, after the first and second images are acquired in the basic array, the third image is acquired in the shifted array, and the fourth image is acquired by performing the pixel shift such that G components in pixel positions lacking the G components can be acquired in the third image. Therefore, it is possible to obtain an image with high luminance resolution at the stage when the fourth pixel shift is performed.

The fifth to eighth images are acquired by performing the pixel shifts such that R components in pixel positions lacking the R component can be acquired in all of the first to fourth images and B components in pixel positions lacking the B components in all of the first to fourth images can be acquired in all of the first to fourth images. Therefore, it is possible to obtain an image with high color resolution.

Note that the respective sections explained above may be configured as circuits. Any circuit may be implemented as a single circuit or may be implemented as a combination of a plurality of circuits as long as the circuit can perform the same function. Further, any circuit is not limited to a circuit configured as a dedicated circuit for performing a target function and may be a circuit configured to perform the target function by causing a general-purpose circuit to execute a processing program.

The image pickup apparatus is mainly explained above. However, the present invention may be an image pickup method for performing an operation same as the operation of the image pickup apparatus or may be a processing program for causing a computer to perform processing same as the processing of the image pickup apparatus, a computer-readable non-transitory recording medium that records the processing program, and the like.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup apparatus comprising:
    an image pickup device including a plurality of pixels two-dimensionally arrayed at a predetermined pixel pitch and configured to receive a light beam, pick up an image, and acquire the image;
    a pixel shift circuit configured to perform a pixel shift for changing a pixel shift position, which is a relative position in a direction of the two-dimensional array of the image pickup device and the light beam received by the image pickup device;
    a control circuit configured to cause the pixel shift circuit to perform pixel shifts to a plurality of different pixel shift positions and cause the image pickup device to perform the image pickup in each of the pixel shift positions and acquire a plurality of images; and
    a detection circuit configured to detect whether a defective image inappropriate as an image used to compose a high-quality image occurs while the predetermined number of images are acquired, wherein
    the control circuit controls the pixel shift circuit to perform the pixel shift in pixel shift order in which an image higher in image quality than one image acquired from the image pickup device can be composed even when, partway in the image pickup of a predetermined number of the images necessary for composing an image having predetermined high image quality, image processing is performed on the basis of two or more images less than the predetermined number, and when the occurrence of the defective image is detected by the detection circuit while the predetermined number of images are acquired, the control circuit performs control different from control performed when the occurrence of the defective image is not detected.

2. The image pickup apparatus according to claim 1, wherein
the image pickup device includes a color filter of an RGB Bayer array, and
after causing the pixel shift circuit to acquire a first image, the control circuit causes the pixel shift circuit to perform a pixel shift and acquire a second image such that a G component in a pixel position lacking the G component can be acquired in the first image.

3. The image pickup apparatus according to claim 2, wherein, after causing the pixel shift circuit to acquire the second image, the control circuit causes the pixel shift circuit to perform pixel shifts and acquire a third image and a fourth image such that an R component in a pixel position lacking the R component can be acquired and a B component in a pixel position lacking the B component can be acquired.

4. The image pickup apparatus according to claim 3, wherein, after causing the pixel shift circuit to acquire the fourth image, the control circuit causes the pixel shift circuit to perform a pixel shift to include a movement amount half-integer times as large as the pixel pitch in both of a vertical direction and a horizontal direction of the two-dimensional array and acquire a fifth image and causes the pixel shift circuit to perform a pixel shift and acquire a sixth image such that a G component in a pixel position lacking the G component can be acquired in the fifth image.

5. The image pickup apparatus according to claim 4, wherein, after causing the pixel shift circuit to acquire the sixth image, the control circuit causes the pixel shift circuit to perform pixel shifts and acquire a seventh image and an eighth image such that R components in pixel positions lacking the R components can be acquired and B components in pixel positions lacking the B components can be acquired in both of the fifth image and the sixth image.

6. The image pickup apparatus according to claim 2, wherein, after causing the pixel shift circuit to acquire the second image, the control circuit causes the pixel shift circuit to perform a pixel shift to include a movement amount half-integer times as large as the pixel pitch in both of a vertical direction and a horizontal direction of the two-dimensional array and acquire a third image and causes the pixel shift circuit to perform a pixel shift and acquire a fourth image such that a G component in a pixel position lacking the G component can be acquired in the third image.

7. The image pickup apparatus according to claim 6, wherein, after causing the pixel shift circuit to acquire the fourth image, the control circuit causes the pixel shift circuit to perform pixel shifts and acquire fifth to eighth images such that R components in pixel positions lacking the R components can be acquired and B components in pixel positions lacking the B components can be acquired in all of the first to fourth images.

8. The image pickup apparatus according to claim 1, further comprising a combination processing circuit configured to compose, from the image in plurality acquired in a plurality of different pixel shift positions, an image higher in image quality than one image acquired from the image pickup device, wherein
when the occurrence of the defective image is detected, the control circuit stops image acquisition thereafter and causes the combination processing circuit to perform processing for composing the high-quality image using images acquired before the defective image.

9. The image pickup apparatus according to claim 8, wherein
a plurality of kinds of the combination processing circuit are provided according to how many images from the first image the composition of the high-quality image is based, and
the control circuit selects the combination processing circuit and causes the combination processing circuit to perform processing according to which image is a defective image detected first by the detection circuit.

10. The image pickup apparatus according to claim 1, further comprising a recording control circuit configured to perform control for recording an image, wherein
when the occurrence of the defective image is detected, the control circuit causes the recording control circuit to perform control for recording, together with an acquired image, which image among the predetermined number of images is detected as the defective image first.

11. The image pickup apparatus according to claim 1, wherein the detection circuit includes at least one of:
a pixel-shift-position detection circuit configured to detect the pixel shift position;
a movement detection circuit configured to detect a movement of the image pickup apparatus;
an environmental-light detection circuit configured to detect a change in light radiated on an object; and
an object-blur detection circuit configured to detect a movement of the object in the acquired image in plurality.

12. An image pickup method comprising:
a pixel shift step for performing, to a plurality of different pixel shift positions, pixel shifts for changing pixel shift positions, which are relative positions of an image pickup device including a plurality of pixels two-dimensionally arrayed at a predetermined pixel pitch and a light beam received by the image pickup device, in a direction of the two-dimensional array;
an image pickup step for causing the image pickup device to receive the light beam and perform the image pickup in the respective plurality of different pixel shift positions and acquire a plurality of images; and
a detection step for detecting whether a defective image inappropriate as an image used to compose a high quality image occurs, wherein
the pixel shift step is a step for, when the occurrence of the defective image is detected by the detection step while the predetermined number of images are acquired, performing control different from control performed when the occurrence of the defective image is not detected, and thereby performing the pixel shifts in pixel shift order in which an image higher in image quality than one image acquired from the image pickup device can be composed even when, partway in the image pickup of a predetermined number of the images necessary for composing an image having predetermined high image quality, image processing is performed on the basis of two or more images less than the predetermined number.

13. A non-transitory computer-readable medium storing a processing program for causing a computer to execute:
a pixel shift step for performing, to a plurality of different pixel shift positions, pixel shifts for changing pixel shift positions, which are relative positions of an image pickup device including a plurality of pixels two-dimensionally arrayed at a predetermined pixel pitch and a light beam received by the image pickup device, in a direction of the two-dimensional array;

an image pickup step for causing the image pickup device to receive the light beam and perform the image pickup in the respective plurality of different pixel shift positions and acquire a plurality of images; and a detection step for detecting whether a defective image inappropriate as an image used to compose a high quality image occurs, wherein the pixel shift step is a step for, when the occurrence of the defective image is detected by the detection step while the predetermined number of images are acquired, performing control different from control performed when the occurrence of the defective image is not detected, and thereby performing the pixel shifts in pixel shift order in which an image higher in image quality than one image acquired from the image pickup device can be composed even when, partway in the image pickup of a predetermined number of the images necessary for composing an image having predetermined high image quality, image processing is performed on the basis of two or more images less than the predetermined number.

* * * * *